United States Patent
Wight et al.

(10) Patent No.: US 7,141,106 B2
(45) Date of Patent: Nov. 28, 2006

(54) INK JET PRINTING COMPOSITION COMPRISING A DYE CONTAINING HYDRAZINE OR HYDRAZIDE

(75) Inventors: Paul Wight, Manchester (GB); Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 413 days.

(21) Appl. No.: 10/469,309

(22) PCT Filed: Feb. 27, 2002

(86) PCT No.: PCT/GB02/00810

§ 371 (c)(1),
(2), (4) Date: Aug. 29, 2003

(87) PCT Pub. No.: WO02/070609

PCT Pub. Date: Sep. 12, 2002

(65) Prior Publication Data

US 2004/0134382 A1 Jul. 15, 2004

Related U.S. Application Data

(60) Provisional application No. 60/505,353, filed on Mar. 21, 2001, provisional application No. 60/304,176, filed on Mar. 21, 2001, provisional application No. 60/304,162, filed on Mar. 21, 2001, provisional application No. 60/304,161, filed on Mar. 21, 2001.

(30) Foreign Application Priority Data

| Mar. 3, 2001 | (GB) | ................. | 0105321.4 |
| Mar. 3, 2001 | (GB) | ................. | 0105324.8 |
| Mar. 3, 2001 | (GB) | ................. | 0105325.5 |
| Mar. 3, 2001 | (GB) | ................. | 0105328.9 |
| Mar. 12, 2001 | (GB) | ................. | 0106007.8 |

(51) Int. Cl.
*C09D 11/02* (2006.01)
*C07C 245/02* (2006.01)
*B41J 2/01* (2006.01)

(52) U.S. Cl. ................. 106/31.51; 106/31.52; 106/31.43; 534/603; 534/885; 347/100

(58) Field of Classification Search ............ 106/31.43, 106/31.47, 31.48, 31.5, 31.49, 31.51, 31.52; 347/100; 564/148; 534/885
See application file for complete search history.

(56) References Cited

U.S. PATENT DOCUMENTS

| 3,245,789 | A | * | 4/1966 | Rogers .................... 430/242 |
| 3,844,785 | A | * | 10/1974 | Puschel et al. ............ 430/242 |
| 4,420,627 | A | | 12/1983 | Widiger ..................... 549/394 |
| 4,598,158 | A | * | 7/1986 | Herchen et al. ........... 549/394 |
| 4,742,160 | A | | 5/1988 | Dore et al. ................. 534/605 |
| 4,855,084 | A | * | 8/1989 | Duthaler et al. ........... 552/290 |
| 5,102,459 | A | * | 4/1992 | Ritter et al. .............. 106/31.36 |
| 5,495,003 | A | | 2/1996 | Pedrazzi et al. ......... 106/31.48 |
| 5,527,385 | A | * | 6/1996 | Sumii et al. .............. 106/31.17 |
| 6,761,759 | B1 | * | 7/2004 | Oki et al. ................ 106/31.43 |
| 2002/0185036 | A1 | * | 12/2002 | Oki et al. ................ 106/31.46 |
| 2003/0010253 | A1 | * | 1/2003 | Oki et al. ................ 106/31.43 |
| 2003/0070582 | A1 | * | 4/2003 | Kitamura et al. ........ 106/31.46 |

FOREIGN PATENT DOCUMENTS

| CH | 441 554 | 1/1968 |
| EP | 0312004 | 4/1989 |
| GB | 751997 | 7/1956 |
| GB | 921250 | 3/1963 |
| GB | 924258 | 4/1963 |
| GB | 929097 | 6/1963 |
| GB | 941009 | 11/1963 |
| GB | 962017 | 6/1964 |
| GB | 2 008 604 | 6/1979 |
| JP | 01198750 | 10/1989 |

* cited by examiner

Primary Examiner—Helene Klemanski
(74) Attorney, Agent, or Firm—Morgan Lewis & Bockius LLP

(57) ABSTRACT

A composition comprising:
  (a) a liquid medium; and
  (b) a compound comprising one or more chromophoric groups and one or more hydrazine or hydrazide groups;
wherein the liquid medium comprises water and an organic solvent, an organic solvent free from water, or a low melting point solid.

The composition is useful for ink jet printing.

13 Claims, No Drawings

INK JET PRINTING COMPOSITION COMPRISING A DYE CONTAINING HYDRAZINE OR HYDRAZIDE

This application is a 371 of PCT/GB02/00810, filed Feb. 27, 2002 and claims the benefit of U.S. provisional Applications 60/505,353; 60/304,176; 60/304161 and 60/304,162, all filed Mar. 21, 2001.

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

With the increasing popularity of using IJP for printing photographic images and for posters displayed outdoors a need has arisen for inks and dyes having improved light-fastness properties. Many of the inks and dyes currently available have poor light-fastness, resulting in discoloration and fading of printed images in a short space of time. The provision of inks and dyes meeting the demanding performance requirements of IJP and at the same time demonstrating improved light-fastness represents a major challenge.

According to the present invention there is provided a composition comprising
(a) a liquid medium; and
(b) a compound comprising one or more chromophoric groups and one or more hydrazine or hydrazide groups;

wherein the liquid medium comprises water and an organic solvent, an organic solvent free from water, or a low melting point solid.

Preferably the compound is red, orange, yellow, green, blue, indigo, violet or black.

Preferably the compound comprises from 1 to 8 groups selected from hydrazine and hydrazide groups, more preferably 1, 2, 3 or 4, especially 1 or 2, more especially 2 groups selected from hydrazine and hydrazide groups. The compound may contain both hydrazine and hydrazide groups.

The hydrazine and hydrazide groups preferably comprise a group of the Formula (2):

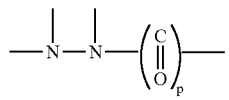

Formula (2)

wherein:
p is 0, 1 or 2.

Groups of Formula (2) where p is zero are hydrazines. When p is 1 or 2 then the groups of Formula (2) are hydrazides. As is well known in the art, the terms hydrazine and hydrazide do not include hydrazone (e.g. =N—NH—) or azo (—N=N—).

Preferred hydrazine and hydrazide groups of Formula (2) are of Formula (2a) or (2b) as follows:

Formula (2a)

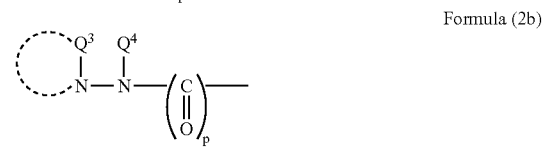

Formula (2b)

wherein:
p is 0, 1 or 2;
$Q^1$ and $Q^2$ are each independently H, optionally substituted alkyl or optionally substituted aryl, or $Q^1$ and $Q^2$ together with the nitrogen atoms to which they are attached form an optionally substituted 5- or 6-membered ring;
$Q^3$ together with the nitrogen atom to which it is attached forms an optionally substituted 5- or 6-membered ring; and
$Q^4$ is H, optionally substituted alkyl or optionally substituted aryl.

Preferably p is 1 or 2, more preferably 1.

Examples of hydrazine groups of Formula (2a) include those listed later in this specification in Table 2, Examples 17, 20, 23, 25, 26, 27, 28, 29, 31, 33, 34, 35 and 37.

Examples of hydrazide groups of Formula (2a) include those listed later in this specification in Table 2, Examples 8, 9, 10, 11, 12, 13, 14, 15, 16, 18, 19, 24, 30, 32 and 38.

Examples of hydrazine groups of Formula (2b) include those listed in Table 5, Example 134 and Table 1, Example 36.

Examples of hydrazide groups of Formula (2b) include the group listed in Table 5, Example 127.

In a preferred embodiment $Q^1$, $Q^2$ and $Q^4$ are each independently H or $C_{1-4}$-alkyl, more preferably H.

Preferably the compound further comprises one or two triazine groups.

Preferably at least one (more preferably all) of the hydrazine and hydrazide groups is located in the compound such that it is connected directly to a triazine ring by one covalent bond.

Preferably the compound further comprises one or more water solubilising groups. Preferred water-solubilising groups are sulpho, carboxy and phosphate.

Preferably the compound has at least one carboxy group, more preferably 1 to 8 carboxy groups, especially 1 to 4 carboxy groups. In one embodiment the compound has at least as many carboxy groups as sulpho groups.

The compound may be in free acid form or in the form of a salt with a cation or mixture of cations. Preferred cations include alkali metals, especially lithium, sodium and potassium, and ammonium and substituted ammonium (e.g. tetramethylammonium or ethylammonium).

Preferably the compound is free from fibre reactive groups, e.g. free from halotriazine groups, because such groups are not needed in the compounds. Furthermore, halotriazine groups may hydrolyse when stored in an ink to release acid and reduce storage stability of the ink.

In preferred aspects of the present invention the composition comprises a compound which:
(i) is free from groups of Formula (1) and salts thereof;
(ii) comprises a single group of Formula (1) or salt thereof; or
(iii) comprises two or more groups of Formula (1) or salts thereof:

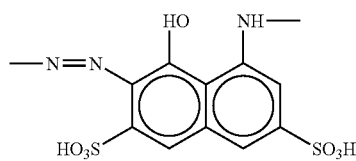

Formula (1)

When the compound is free from groups of Formula (1) and salts thereof the compound is preferably of Formula (3) or a salt thereof:

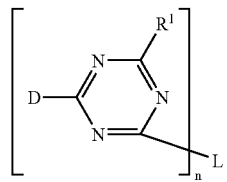

Formula (3)

wherein:

each D independently is a chromophoric group;
n is at least one;
$R^1$ is H or a substituent; and
L is an organic group of valency n;

provided that:
(i) the compound comprises one or more hydrazide or hydrazine group, preferably of Formula (2), more preferably of Formula (2a) or (2b), as hereinbefore defined; and
(ii) the compound is free from groups of Formula (1) and salts thereof, as hereinbefore defined.

The hydrazine and hydrazide group preferably forms part of L and/or $R^1$. Preferably the hydrazine or hydrazide group is attached directly to the triazine ring shown in Formula (3).

Preferably n is 1, 2, 3 or 4, more preferably 1, 2 or 3, especially 1 or 2.

Each D independently is preferably an azo (especially mono azo or disazo), formazan, metallised azo, methine, azamethine, xanthene, triphenyl methane, phthalocyanine or anthraquinone chromophore or a combination thereof.

Preferred azo chromophores represented by D are of the Formula (4):

Ar—N=N—Y—Z—    Formula (4)

wherein:

Ar is optionally substituted aryl;
Y is optionally substituted arylene;
Z is O, S, a hydrazine group, a hydrazide group or $NR^2$; and
$R^2$ is H, optionally substituted alkyl, optionally substituted aryl or optionally substituted acyl;
provided that the group of Formula (4) is free from groups of Formula (1) and salts thereof.

Ar is preferably optionally substituted phenyl, optionally substituted naphthyl or optionally substituted benzthiazolyl.

Y is preferably optionally substituted phenylene or optionally substituted naphthylene.

Suitable substituents on Ar and Y include sulpho, carboxy, —$SO_3H$, —$PO_3H_2$, —$CF_3$, optionally substituted $C_{1-10}$-alkoxy, optionally substituted $C_{1-10}$-alkyl, azo groups, hydrazide groups, hydrazine groups, especially of Formula (2) as hereinbefore defined, optionally substituted amino, halo, —CN, —OH, —$NO_2$ and —$SO_2CH=CH_2$.

Preferably each Ar has a substituent at the 2-position relative to the azo group shown in Formula (4). Preferably this 2-substituent is —$SO_3H$ or —$CO_2H$.

In a preferred embodiment, $R^1$ is H, OH, a chromophoric group, halo, optionally substituted alkyl, —$NR^3R^4$, —$N(Q^1)$—$N(Q^2)R^2$, —$OR^2$ or —$SR^2$; wherein:
each $R^2$, $Q^1$ and $Q^2$ independently is as hereinbefore defined;
each $R^3$ and $R^4$ independently is H, optionally substituted alkyl, optionally substituted aryl or optionally substituted acyl, or $R^3$ and $R^4$ together with the N atom to which they are attached form an optionally substituted 5- or 6-membered ring.

Preferred halo groups represented by $R^1$ include F and Cl. When $R^1$ is —$NR^3R^4$ it is preferred that each $R^3$ and $R^4$ independently is H, optionally substituted alkyl, optionally substituted aryl or optionally substituted heterocyclyl, or $R^3$ and $R^4$ together with the nitrogen atom to which they are attached form an optionally substituted 5- or 6-membered ring.

However, especially preferred $R^1$ groups are OH, Cl, —$NR^3R^4$ and —$N(Q^1)$-$N(Q^2)R^2$ wherein $R^2$, $R^3$, $R^4$, $Q^1$ and $Q^2$ are as hereinbefore defined.

Examples of groups represented by $R^1$ include —$NHCH_2CHOHCH_2OH$, —$NH(CH_2)_2SO_3H$, —$NH(CH_2)_2O(CH_2)_2OH$, —$NCH_3CH_2CO_2H$,

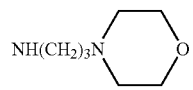

—$NH(CH_2)_9CH_3$, —$NH(CH_2)_5OH_3$, —$NH(CH_2)_7CH_3$, —$NH(CH_2)_2CH(CH_3)_3$,

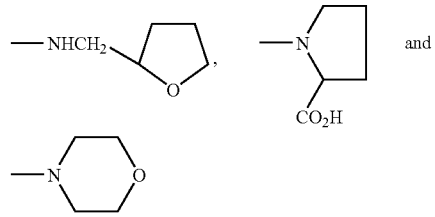

L is preferably an organic linking group (especially a divalent organic linking group) comprising a sulphur, oxygen or nitrogen atom at one or both ends, more preferably an amino group of formula —$NR^2$— or a hydrazine or hydrazide group at one or both ends. Preferably L comprises from 2 to 20, more preferably from 2 to 10 carbon atoms. Thus L is preferably of the formula —$X^1$—$(L^1$—$X^2)_m$— wherein:

m is 0 or 1;

L¹ is an optionally substituted, optionally interrupted alkylene group or an optionally substituted arylene group; and X¹ and X² are each independently of the formula —NR²— or a hydrazine or hydrazide group.

When L¹ is an optionally substituted, optionally interrupted alkylene group, it is preferably optionally substituted, optionally interrupted $C_{1-20}$-alkylene.

Preferred optional interrupting groups for $R^2$, $R^3$, $R^4$, $Q^1$, $Q^2$ and L¹ are selected from —SS—, —CO—, —CS—, —CO₂—, phenylene, triazine, —S—, —CH=CH—, hydrazine groups, hydrazide groups and —NR²—, wherein $R^2$ is as hereinbefore defined.

L¹ is preferably —CO—$C_{1-20}$-alkylene-CO— or —$C_{1-20}$-alkylene, optionally interrupted by —O—, —S—, —S—, —CO—, —CS—, —CO₂—, —CH=CH—, —N(Q¹)—N(Q²)— or NR², wherein $R^2$, $Q^1$ and $Q^2$ are as previously defined, and optionally substituted by —OH or —CO₂H.

When L¹ is interrupted, it preferably contains 1 to 5 interrupting groups, more preferably one or two interrupting groups. The interrupting groups may be part way along the alkylene group (e.g. —CH₂COCH₂—) or at the end of the alkylene group (e.g. —CO(CH₂)₂CO).

When L¹ is an optionally substituted arylene group, then the optional substituents are as previously described. However, more preferably, the arylene group is unsubstituted, and is a phenylene group, especially 1,4-phenylene.

Examples of suitable groups represented by L include:

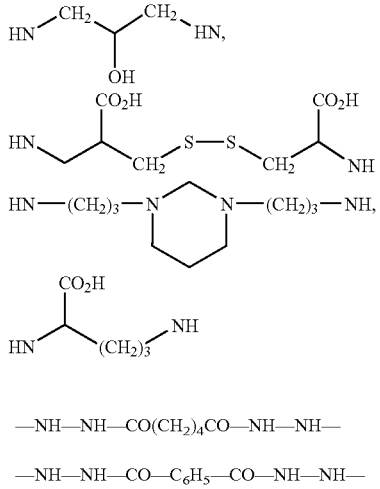

—NH—NH—CO(CH₂)₄CO—NH—NH—

—NH—NH—CO—C₆H₅—CO—NH—NH—

When $R^1$, $R^2$, $R^3$, $R^4$, $Q^1$, $Q^2$ or $Q^4$ is optionally substituted, alkyl, it is preferably $C_{1-20}$-alkyl, more preferably $C_{1-10}$-alkyl, especially $C_{1-6}$-alkyl, more especially $C_{1-4}$-alkyl, each of which is optionally substituted and optionally interrupted. The optional substituents are preferably selected from $C_{1-6}$-alkoxy, halo (preferably F or Cl) $C_{1-6}$-hydroxy alkoxy, —OH, —CO₂H, —SO₃H, —PO₃H₂, —CN, optionally substituted phenyl, a 5- or 6-membered heterocyclic group and optionally substituted amino.

Preferred 5- or 6-membered rings and heterocyclic groups include furanyl, pyranyl, pyridyl, pyridinium, tetrahydrofuranyl, thiophenyl and carboxymethyl thiophenyl.

When $R^2$, $R^3$, $R^4$, $Q^1$, $Q^2$ or $Q^4$ is optionally substituted aryl it is preferably optionally substituted phenyl, naphthyl, thiazolyl, pyridyl, furanyl or pyranyl, more preferably optionally substituted phenyl. The optional substituents are preferably selected from $C_{1-6}$-alkoxy, halo (preferably F or Cl), OH, —CN, —CO₂H, —SO₃H, —PO₃H₂, —NO₂, —NH₂, —COC₁₋₄-alkyl, —NHCOC₁₋₄-alkyl, —(C₁₋₆-alkylene)O(C₁₋₆-alkylene)OC₁₋₄-alkyl, —(C₂₋₆-alkylene)OC₂₋₆-alkylene OH, —SO₂NH₂, —SO₂NHC₁₋₄-alkyl, C₁₋₆-alkyl and C₁₋₆-alkyl substituted by OH, —CO₂H or —SO₃H.

When $R^1$, $R^2$, $R^3$, $R^4$, $Q^1$, $Q^2$ or $Q^4$ is alkyl substituted by an optionally substituted phenyl group, it is preferably an aralkyl group of the formula:

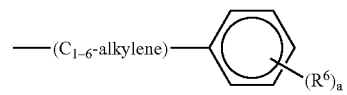

wherein:

each $R^6$ independently is $C_{1-4}$-alkyl, $C_{1-4}$-alkoxy, halo, —OH, —NH₂, —CO₂H, —SO₃H, or —PO₃H₂; and a is 0 to 5.

Preferably a is 0, 1 or 2.

Especially preferred aralkyl groups are benzyl and 2-phenylethyl, each of which is optionally substituted by —CO₂H, —OH or —SO₃H.

When $R^3$ and $R^4$ together with the nitrogen to which they are attached form an optionally substituted ring it is preferably an optionally substituted 5- or 6-membered ring, more preferably a piperazinyl, piperidinyl or morpholinyl ring. The optional substituents are preferably selected from —OH, —CO₂H, —SO₃H, —C₁₋₆-alkoxy, —C₁₋₆alkyl and —C₁₋₆-alkyl substituted by —OH, —CO₂H or —SO₃H.

$R^2$, $R^3$, $R^4$, $Q^1$, $Q^2$ and $Q^4$ are preferably each independently H or $C_{1-4}$-alkyl.

Preferred compounds are of Formula (3) are of Formula (3a), (3b), (3c) or (3d):

Formula (3a)

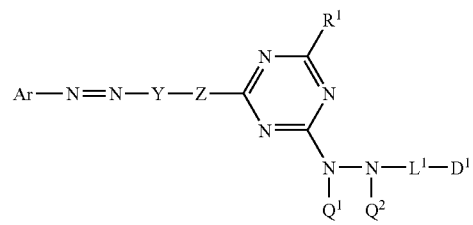

Formula (3b)

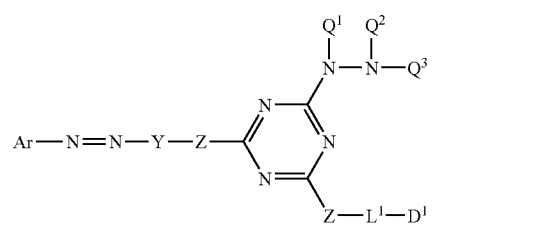

Formula (3c)

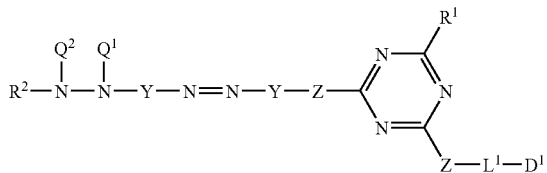

-continued

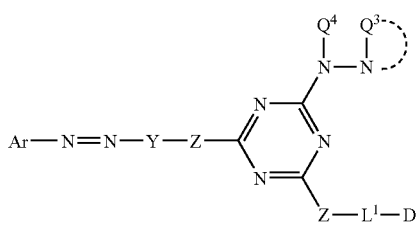
Formula (3d)

wherein:

$D^1$ is H or a group of formula —Z—Y—N=N—Ar; and each Ar, $R^1$, $R^2$, Z, Y, $Q^1$, $Q^2$, $Q^3$, $Q^4$ and $L^1$ independently is as hereinbefore defined; provided that the compound of Formula (3a), (3b), (3c) or (3d) is free from groups of Formula (1) and salts thereof.

The preferences for Ar, $R^1$, Z, Y, $Q^1$, $Q^2$, $Q^3$, $Q^4$ and $L^1$ in compounds of Formula (3a), (3b), (3c) or (3d) and the preferred salt forms are as hereinbefore defined for compounds of Formula (3).

When the compound comprises a single group of Formula (1) or a salt thereof the compound is preferably of Formula (5) or a salt thereof:

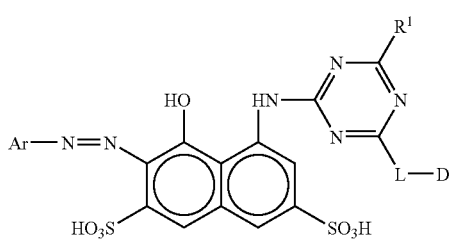
Formula (5)

wherein:

D is H or chromophoric group; and

Ar, L and $R^1$ are as hereinbefore defined;

provided that:
(i) the compound comprises one or more hydrazine or hydrazide groups, preferably of Formula (2), more preferably of Formula (2a) or (2b), as hereinbefore defined;
(ii) the compound has a single group of Formula (1) or salt thereof, as hereinbefore defined.

The hydrazine or hydrazide group preferably forms part of -L-D and/or $R^1$, preferably being attached directly to the triazine ring shown in Formula (5).

In compounds of Formula (5) L is preferably a divalent organic linking group, more preferably a divalent organic linking group comprising a sulphur, oxygen or nitrogen atom at each end, especially an amino group of formula —$NR^4$ or a group of Formula (2a) at one or both ends. Preferably L contains from 2 to 20 carbon atoms more preferably 2 to 10 carbon atoms. Thus in compounds of Formula (5) L is preferably of the formula:

$$-X^3-(L^1-X^4)_m-$$

wherein:

m is 0 or 1;

$L^1$ is as hereinbefore defined; and $X^3$ and $X^4$ are each independently O, S, of the formula —$NR^4$ or Formula (2) (especially (2a)) as hereinbefore defined.

Thus preferred compounds of Formula (5) are of the Formula (5a), (5b), (5c) or (5d) or a salt thereof:

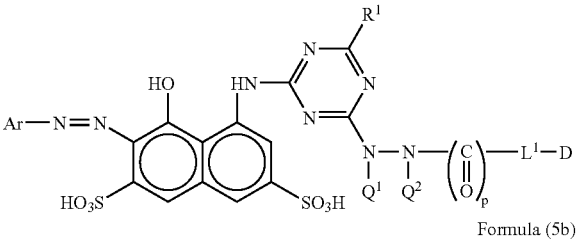
Formula (5a)

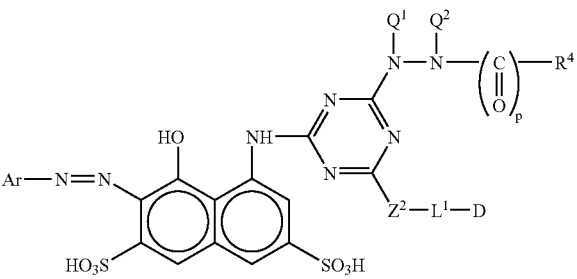
Formula (5b)

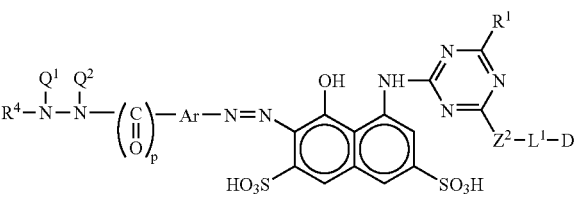
Formula (5c)

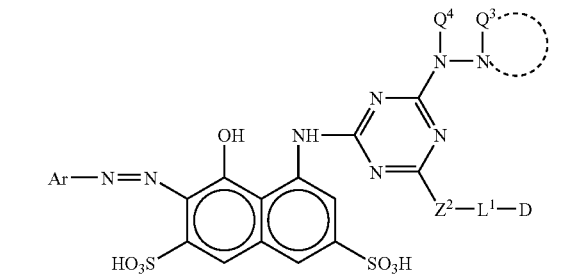
Formula (5d)

wherein:

$Z^2$ is O, S or $NR^4$;

$R^4$ is H, optionally substituted alkyl, optionally substituted aryl or optionally substituted acyl; and Ar, $L^1$, $R^1$, $Q^1$, $Q^2$, $Q^3$, $Q^4$ and D are as hereinbefore defined and preferred; provided that the compounds of Formula (5a), (5b), (5c) and (5d) comprise a single group of Formula (1) or salt thereof.

Preferred optionally substituted alkyl, optionally substituted aryl and optionally substituted acyl groups represented by $R^4$ in compounds of Formula (5) are as hereinbefore described.

Preferably D is H, an azo (especially mono azo or disazo), formazan, metallised azo, methine, azamethine, xanthene, triphenyl methane, phthalocyanine or anthraquinone chromophore or a combination thereof.

In a preferred embodiment of compounds of Formula (5) $R^1$ is H, OH, halo, optionally substituted alkyl, —$NR^3R^4$, —$N(Q^1)$—$N(Q^2)R^2$, —$OR^2$, —$SR^2$ or of Formula (2b) as hereinbefore defined wherein p is 0;

wherein $R^2$, $R^3$, $R^4$, $Q^1$ and $Q^2$ are as hereinbefore defined.

For the avoidance of doubt, 'single' means one and only one, not including two or more.

In compounds of Formula (5) D is preferably H or an azo (especially mono azo or disazo), formazan, xanthine, methine, azomethine, metallised azo, phthalocyanine or anthraquinone chromophore.

Preferred azo chromophores represented by D are of the Formula (6) or a salt thereof:

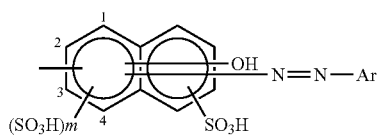

Formula (6)

wherein m is 0 or 1 and Ar independently is as hereinbefore defined, provided that D is not and does not comprise a group of Formula (1) as hereinbefore defined.

In one embodiment at least one of the hydrazine or hydrazide groups, preferably all of the hydrazine and hydrazide groups, forms part of an in chain link between the group of Formula (1) and a chromophoric group other than a group of Formula (1). In another embodiment at least one of the hydrazine or hydrazide groups, preferably all of the hydrazine and hydrazide groups, are not part of an in chain link between the group of Formula (1) and a chromophoric group other than a group of Formula (1).

When the compound of the present invention comprises two or more groups of the Formula (1) or salts thereof the compound is preferably of Formula (7) or a salt thereof:

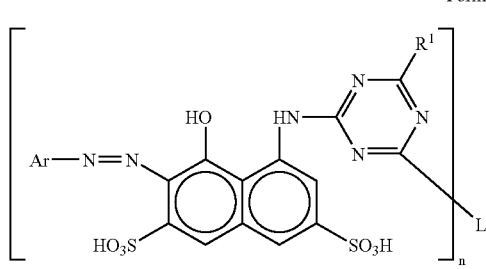

Formula (7)

wherein:

each Ar, $R^1$ and L are as hereinbefore defined; and n is 2 or more;

provided that:
(i) the compound comprises one or more hydrazine or hydrazide groups, preferably of Formula (2), more preferably of Formula (2a) or (2b), as hereinbefore defined.

In compounds of Formula (7), the hydrazine or hydrazide group preferably forms part of -L and/or $R^1$, preferably being attached directly to the triazine ring shown in Formula (7).

Thus preferred compounds of Formula (7) are of the Formula (7a), (7b), (7c) or (7d) or a salt thereof:

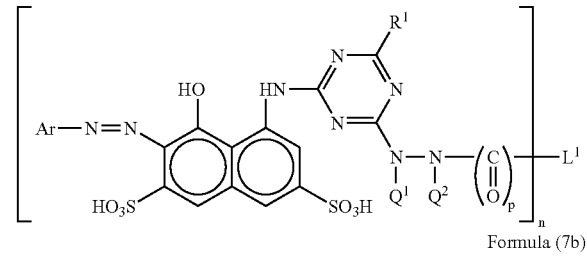

Formula (7a)

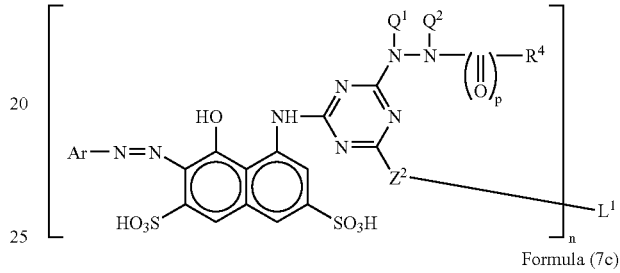

Formula (7b)

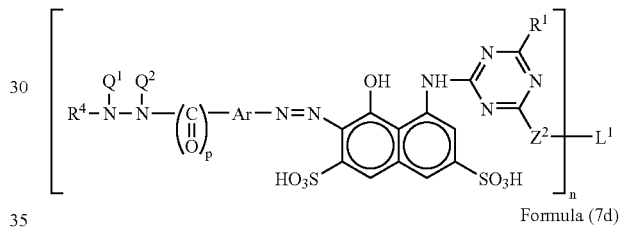

Formula (7c)

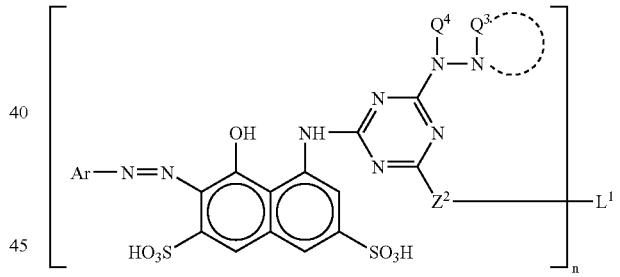

Formula (7d)

wherein:

$Z^2$, $R^4$, $L^1$, Ar, $R^1$, $Q^1$, $Q^2$, $Q^3$, $Q^4$ and D and the preferences for these integers are as hereinbefore defined and n is 2 or more.

In compounds of Formula (7) n is preferably 2, 3 or 4, more preferably 2 or 3, especially 2.

When the compound of Formula (7) contains a further chromophoric group in addition to the two or more groups of Formula (1) this chromophoric group is preferably H or an azo (especially mono azo or disazo), formazan, xanthine, methine, azomethine, is metallised azo, phthalocyanine or anthraquinone chromophore. Preferred azo chromophores are of the Formula (6) as previously defined.

In a preferred embodiment of the compounds of Formula (7):

n is 2;

L is —NH—NHCO-phenylene-CONH—NH—;

Ar is phenyl or naphthyl having 0, 1, 2 or 3 substituents selected from the group consisting of carboxy, sulpho and $C_{1-4}$-alkyl; and $R^1$ is H or $C_{1-4}$-alkyl.

The compounds may exist in tautomeric forms other than those shown in this specification, for example the hydrazo tautomer. These tautomers are included within the scope of the present claims.

Preferably the composition comprises 0.1 to 20, more preferably from 0.5 to 15, and especially from 1 to 5 parts of component (a) and from 99.9 to 80, more preferably from 99.5 to 85, especially from 99 to 95 parts of component (b), wherein all parts are by weight and the total number of parts of (a)+(b)=100.

Preferably component (b) is completely dissolved in component (a). Preferably component (b) has a solubility in component (a) at 20° C. of at least 10%. This allows the preparation of concentrates which may be used to prepare more dilute inks and reduces the chance of the dye precipitating if evaporation of the liquid medium occurs during storage.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-soluble miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. Nos. 4,963,189, 4,703,113, 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The compounds defined in the first aspect of the invention may be dissolved in the low melting point solid or may be finely dispersed in it.

The composition may also contain additional components conventionally used in ink jet printing inks, for example viscosity and surface tension modifiers, corrosion inhibitors, biocides, kogation reducing additives and surfactants which may be ionic or non-ionic.

The composition may be used as a concentrate to make ink jet printing inks or, more preferably, the composition is an ink, especially an ink jet printing ink.

The compositions may be, and preferably are, purified to remove undesirable impurities. Conventional techniques may be employed for purifying the compounds, for example ultrafiltration, reverse osmosis and/or dialysis. Thus the compositions of the present invention preferably have a total concentration of divalent and trivalent metal ions of less that 500 ppm, more preferably less than 100 ppm, especially less than 20 ppm, where ppm refers to parts per million by weight.

Preferably the composition of the present invention have been filtered through a filter having a mean pore size below 10 μm, more preferably below 2 μm, especially below 1 μm.

According to a second aspect of the present invention there is provided a compound as defined in the first aspect of the present invention, provided that the compound is free from halotriazine groups and/or the hydrazine or hydrazide groups are of Formula (2a) or (2b) as hereinbefore defined wherein p is 1 and/or the compound comprises at least one water-solubilising group.

The preferences described above in relation to the preferred compounds to be included in the compositions according to the first aspect of the present invention also apply to the compounds per se according to the second aspect of the present invention.

The preferences for the compounds of the second aspect of the present invention are as hereinbefore described for the compounds used as component (b) according to the first aspect of the present invention (especially preferred are the compounds of Formulae (3), (5) and (7)) provided that the compound is in all cases free from halotriazine groups.

The compounds of the invention may be prepared by methods analogous to those used in the field of ink jet printing except that at least one of the starting materials is selected which contains a hydrazine and/or hydrazide group and which is (i) either free from groups of Formula (1) or salts thereof; (ii) comprises a single group of Formula (1) or a salt thereof; or (iii) comprises two or more groups of Formula (1) or salts thereof in the compound. For example known compounds having labile groups and one group of Formula (1), e.g. reactive dyes as disclosed in the Colour Index International, may be condensed with hydrazine or hydrazide compounds at pH below 7. The Examples described later in this specification illustrate more specifically the reaction conditions which may be employed to make compounds of the invention.

A third aspect of the invention provides a process for the coloration of a substrate comprising applying thereto by means of an ink jet printer a composition according to the first aspect of the present invention or a compound according to the second aspect of the present invention.

The ink jet printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The substrate is preferably paper, plastic, a textile, metal or glass, more preferably an overhead projector slide, especially paper, more especially a porous paper.

Preferred papers are plain or treated papers (especially porous papers) which may have an acid, alkaline or neutral character. Examples of commercially available treated papers include HP Premium Coated Paper, HP Photopaper (all available from Hewlett Packard Inc.), Stylus Pro 720 dpi Coated Paper, Epson Premium Glossy Photopaper. Epson Photo Quality Gloss Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror Paper (available from Wiggins Teape Ltd), Xerox Acid Paper and Xerox Alkaline Paper, Xerox Acid Paper (available from Xerox).

Preferred porous papers comprise;
 (a) an inorganic absorbent pigment, preferably silica or alumina; and
 (b) a binder resin.

The binder resin preferably comprises polyvinylalcohol, polyvinyl pyrrolidone or a mixture thereof.

The preference for porous papers arises because these papers, in combination with the compounds and compositions of the present invention, lead to prints having particularly good light-fastness properties.

The preference for porous papers arises because these papers, in combination with the compounds and compositions of the present invention, lead to prints having particularly good light-fastness properties.

A fourth aspect of the present invention provides a substrate, preferably a paper, a slide or a textile material printed with a composition according to the first aspect of the present invention, by a compound according to the second aspect of the present invention, or by means of a process according to the third aspect of the present invention.

According to a fifth aspect of the present invention there is provided an ink jet printer cartridge comprising a chamber and ink, wherein the ink is present in the chamber and the ink comprises a composition according to the first aspect of the present invention or a compound according to the second aspect of the invention.

According to a sixth aspect of the present invention there is provided an ink jet printer containing an ink jet printer cartridge, wherein the ink jet printer cartridge is as defined in the fifth aspect of the present invention.

The invention is further illustrated by way of the following examples in which all parts and percentages are by weight unless otherwise stated.

EXAMPLE 1

Preparation of a Compound of Formula (A) wherein $R^1$ is —NHCH$_2$CHOHCH$_2$OH and -L$^1$-D$^1$ is —CONH$_2$

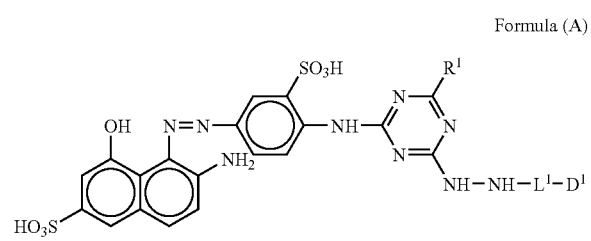

Formula (A)

Stage (a)

C.I Acid Red 34 (144 g, 0.2 mol, available from sources indicated in the Colour Index International) was dissolved in de-ionised water (1.5l) and screened through GF/A filter paper to ensure a solution cooled and stirred at 0–5° C.

A few drops of calsolene oil were added, followed by cyanuric chloride. The mixture was stirred for ~2 hours, the pH was then raised to 6.5 to 7 using 2N sodium hydroxide, then screened through GF/A filter paper to remove excess cyanuric chloride.

1-amino-2,3-propanediol (0.22 mol) was added with stirring at ~30° C., whilst the pH was maintained at 8.5, controlled with 2N sodium hydroxide. A sample was examined by HPLC and was deemed to be satisfactory. The mixture was cooled to room temperature and isolated by addition to acetone (~7.5 l), then filtered and pulled fairly dry. The product obtained was dried under vacuum at room temperature, giving a magenta solid (147.9 g).

Stage (b)

The product of stage (a) (40 g) was stirred in de-ionised water (350 ml) along with H$_2$NNHCONH$_2$ (14.19) at ~30°

C., whilst the pH was maintained at ~8.5 using 2N sodium hydroxide. Progress of the reaction was found to be satisfactory by HPLC after ~10 hours reaction time. The product was then cooled to room temperature and isolated by addition to Methylated Spirits 74 OP (~2.5l), and filtered through GF/A filter paper then pulled fairly dry. The resultant solid was re-dissolved in de-ionised water (~300 ml) and dialysed to low conductivity using visking tubing. The resultant solution was filtered through GF/A, then GF/F filter paper and finally through Nylon 0.45 microns. The resultant solution was evaporated to dryness under reduced pressure, giving the title product as a magenta solid (32.4 g).

EXAMPLE 2

Preparation of a Compound of Formula (A) wherein $R^1$ is —NHCH$_2$CH$_2$SO$_3$H and -L$^1$-D$^1$ is —CONH$_2$.

The method of Example 1 was repeated except that in place of H$_2$NCH$_2$CHOHCH$_2$OH there was used an equimolar amount of H$_2$NCH$_2$CH$_2$SO$_3$H.

EXAMPLE 3

Preparation of a Compound of Formula (A) wherein $R^1$ is —N(CH$_2$CO$_2$H)(CH$_2$PO$_3$H$_2$) and -L$^1$-D$^1$ is CONH$_2$.

The method of Example 1 was repeated except that in place of H$_2$NCH$_2$CHOHCH$_2$OH there was used an equimolar amount of —HN(CH$_2$CO$_2$H)(CH$_2$PO$_3$H$_2$).

EXAMPLE 4

Preparation of a Compound of Formula (A) wherein $R^1$ is —N(CH$_2$CO$_2$H)(CH$_2$PO$_2$H$_2$) and -L$^1$-D$^1$ is COCONH$_2$.

The method of Example 1 was repeated except that in place of H$_2$NCH$_2$CHOHCH$_2$OH there was used an equimolar amount of HN(CH$_2$CO$_2$H)(H$_2$PO$_3$H$_2$) and in place of H$_2$NNHCONH$_2$ there was used H$_2$NNHCOCONH$_2$.

EXAMPLE 5

Inks and Ink Jet Printing

The compound from Example 3 was made up into an ink according to the formulation shown below. For comparison purposes a compound lacking the hydrazo (—NH—NH—) group, shown below as Comparative Dye (X), was made into an identical ink:

Comparative Dye (X)

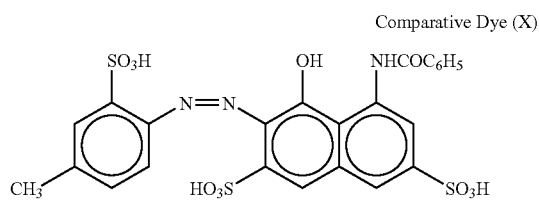

The ink formulation had a pH8 and the following components (all parts by weight)

| Component | Amount |
| --- | --- |
| Compound | 3.5 |
| 2-pyrrolidone | 5 |
| thiodiglycol | 5 |
| Surfynol ™ 4651 | |
| Water | 85.5 |

The inks were placed in a Canon 4300 ink jet printer and printed onto the papers indicated in Table 1 below. After drying, the light fastness of the prints were measured by radiating the papers in an Atlas Ci 5000 Weatherometer and recording the level of fade (ΔE). A high value of ΔE indicates low light fastness and a low value of ΔE indicates high light fastness. The results of these measurements are shown in Table 1 below:

TABLE 1

| Compound | Paper | ΔE |
| --- | --- | --- |
| Example 3 | Kodak photo paper | 5 |
| Comparative Dye (X) | Kodak photo paper | 79 |
| Example 3 | GP301 | 16 |
| Comparative Dye (x) | GP301 | 35 |

Table 1 shows that compounds of the invention have higher light fastness (lower ΔE) than Comparative Dye (X).

EXAMPLE 7

Preparation of the Compound of Formula (A1) wherein $R^1$ is OH and -L-D is —NH—NH—COCONH$_2$ Formula (A1)

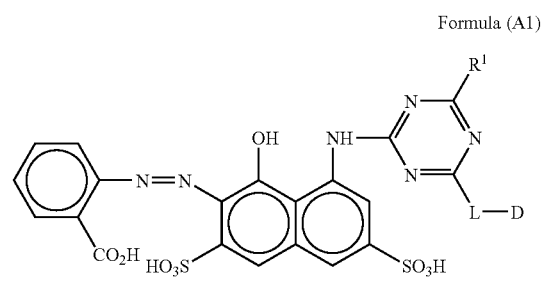

Stage (a) Preparation of Dichlorotriazine Compound

Stage a

1-Amino-8-hydroxy-3,6-disulpho-2-(2-carboxy phenyl azo)napthalene (prepared as described in European Patent Application No. 682088 A1, page 17, lines 50 to 53) (5 parts) was suspended in water (50 parts) and dissolved by the addition of 2M sodium hydroxide solution to pH7. The solution was cooled to 0–5° C. and a slurry of cyanuric chloride (5.5 parts) in water (50 mls) containing calsolene oil (0.1 g). The resulting mixture was stirred for 2 hours at 0–5° C. and the pH of the mixture was maintained at 6.5–7 by the addition of 2M sodium hydroxide solution as required, to give the dichlorotriazinyl compound.

Stage (b)—Reaction with Hydrazine

Stage b

Oxamic hydrazide (1 part) was added to a solution of the dichorotriazine (1part) and the pH of the mixture raised to 8.5 with 2M sodium hydroxide solution. The temperature was allowed to rise to 20–25° C. and the mixture stirred at pH 8.5/20–25° C. for 2.5 hours.

Stage (c)—Conversion of $R^4$=Cl to $R^4$=OH

Stage c 1,4-diazabicyclo[2.2.2]octane (0.01 parts) was added to a solution of the monochlorotraizine in water (1 part in 10) and the pH was raised to 10.5–11.0 with 2M sodium hydroxide solution. The mixture was heated to 80–85° C. and held there until the hydrolysis was complete. Sodium chloride was added to 10% w/v and the pH brought to 7 with concentrated hydrochloric acid. The mixture was cooled to 60° C., the product was is filtered off and washed with 15% w/v sodium chloride solution. The wet product was dissolved in dilute sodium hydroxide solution and dialysed in visking tubing to low conductivity. The dialysed solution was screened through a 0.71 µm filter and the solution evaporated to dryness at 50° C. to give the title compound.

The resultant compound had a λ max at 553 nm.

EXAMPLES 8 TO 38

The method of Example 7 was repeated except that in step (b), in place of oxamic hydrazide there was used an equimolar amount of the hydrazine specified in Table 2, column 2. The resultant compound was of Formula (A1) wherein $R^1$ and -L-D are as specified in Table 2.

TABLE 2

| | | Resultant Compound | |
|---|---|---|---|
| Example | Hydrazine | -L-D | $R^1$ |
| 8 | $H_2NNHCO(CH_2)_6CH_3$ | —HNNHCO(CH$_2$)$_6$CH$_3$ | —OH |
| 9 | $H_2NNHCO$—(3-pyridyl) | —HNNHCO—(3-pyridyl) | —OH |
| 10 | $H_2NNHCO$—(4-pyridyl) | —HNNHCO—(4-pyridyl) | —OH |
| 11 | $H_2NNHCOC_6H_5$ | —HNNHCOC$_6$H$_5$ | —OH |
| 12 | $H_2NNHCO$—(2-thienyl) | —HNNHCO—(2-thienyl) | —OH |
| 13 | $H_2NNHCO$—(2-furyl) | —HNNHCO—(2-furyl) | —OH |
| 14 | $H_2NNHCONHC_6H_5$ | —HNNHCONHC$_6$H$_5$ | —OH |
| 15 | $H_2NNHCONH_2$ | —HNNHCONH$_2$ | —OH |
| 16 | $H_2NNHCOCH_3$ | —HNNHCOCH$_3$ | —OH |
| 17 | $H_2NNH$—(2-hydroxyphenyl) | —NHNH—(2-hydroxyphenyl) | —OH |
| 18 | $H_2NNHCOCH_2$—N$^+$(pyridinium) | —HNNHCOCH$_2$—N$^+$(pyridinium) | —OH |
| 19 | $H_2NNHCOCHN^+(CH_3)_3$ | —HNNHCOCH$_2$N$^+$(CH$_3$)$_3$ | —OH |
| 20 | $H_2NNHC_6H_5$ | —NHNHC$_6$H$_5$ | —OH |
| 21 | $H_2NNH(CH_2CH_2)_2NCH_3$ | —NHN(CH$_2$CH$_2$)$_2$NCH$_3$ | —OH |
| 22 | $H_2NNH$—(C$_6$H$_4$)—CO$_2$H | —NHNH—(C$_6$H$_4$)—CO$_2$H | —OH |
| 23 | $H_2NNHCH_2CH_2OH$ | —HNNHCH$_2$CH$_2$OH | —OH |
| 24 | $H_2NNHCOCH_2C_6H_5$ | —NHNHCOCH$_2$C$_6$H$_5$ | —OH |

TABLE 2-continued

| Example | Hydrazine | Resultant Compound -L-D | $R^1$ |
|---|---|---|---|
| 25 | H₂NNH—(3-F-C₆H₄) | —NHNH—(3-F-C₆H₄) | —OH |
| 26 | H₂NNH—(3-SO₃H-C₆H₄) | —HNNH—(3-SO₃H-C₆H₄) | —OH |
| 27 | H₂NNHCH₂C₆H₅ | —HNNHCH₂C₆H₅ | —OH* |
| 28 | H₂NNH—(3-Cl-C₆H₄) | —HNNH—(3-Cl-C₆H₄) | —OH |
| 29 | H₂NNH—(4-Cl-C₆H₄) | —HNNH—(4-Cl-C₆H₄) | —OH |
| 30 | H₂NNHCO—(3-OCH₃-C₆H₄) | —NHNHCO—(3-OCH₃-C₆H₄) | —OH |
| 31 | H₂NNHCH₃ | —NHNHCH₃ | —OH |
| 32 | H₂NNHCOCH₂CN | —NHNHCOCH₂CN | —OH |
| 33 | H₂NNH—(3-Br-C₆H₄) | —NHNH—(3-Br-C₆H₄) | —OH |
| 34 | H₂NNHC(CH₃)₃ | —NHNHC(CH₃)₃ | —OH |
| 35 | H₂NNH—(2-CF₃-C₆H₄) | —NHNH—(2-CF₃-C₆H₄) | OH |
| 36 | HN(morpholine) | —N(morpholine) | —OH |
| 37 | H₂NNH—(3-CO₂H-C₆H₄) | —HNNH—(3-CO₂H-C₆H₄) | —OH |
| 38 | H₂NNHCO—(4-C(CH₃)₃-C₆H₄) | —NHNHCO—(4-C(CH₃)₃-C₆H₄) | —Cl* |

*hydrolysis step omitted.

EXAMPLES 39 TO 62

The method of Example 7 was repeated except that in stage (b) place of oxamic hydrazide there was used an equivalent amount of the hydrazine compound specified in Table 3, column 2, and stage (c) was replaced by condensation of the product of stage (b) (1 part) in water (10 parts) at 85° C. with the nucleophile (3 parts) listed in Table 3, column 3. The resultant compound was of the Formula (A1) wherein $R^1$ and -L-D are as in Table 3.

TABLE 3

| Example | hydrazine | nucleophile | Resultant Compound -L-D | $R^1$ |
|---|---|---|---|---|
| 39 | $H_2NNHCOC_6H_5$ | $H_2NCH_2CHOHCH_2OH$ | $—NHNHCOC_6H_5$ | $—NHCH_2CHOHCH_2OH$ |
| 40 | $H_2NNHCO$—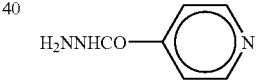 | $H_2NCH_2CHOHCH_2OH$ | —HNNHCO—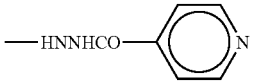 | $—NHCH_2CHOHCH_2OH$ |
| 41 | $H_2NNHCOCH_3$ | $H_2NCH_2CHOHCH_2OH$ | $—HNNHCOCH_3$ | $—NHCH_2CHOHCH_2OH$ |
| 42 | $H_2NNHCOCONH_2$ | $H_2NCH_2CHOHCH_2OH$ | $—HNNHCOCONH_2$ | $—NHCH_2CHOHCH_2OH$ |
| 43 | $H_2NNHCOCH_3$ | 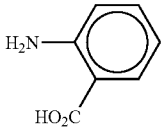 | $—HNNHCOCH_3$ | 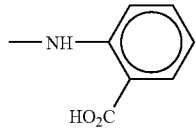 |
| 44 | $H_2NNHCOCONH_2$ | 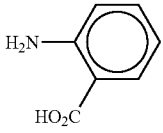 | $—HNNHCOCONH_2$ | 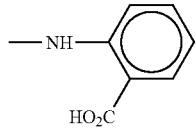 |
| 45 | $H_2NNHCOC_6H_5$ | 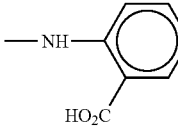 | $—NHNHCOC_6H_5$ | 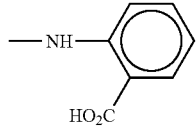 |
| 46 | $H_2NNHCOCH_3$ | 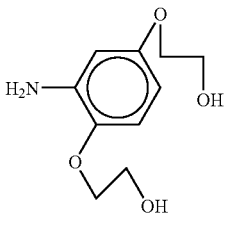 | $—NHNHCOCH_3$ | 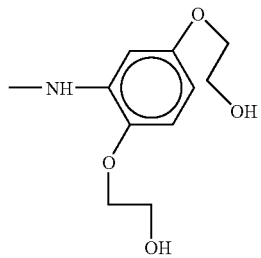 |
| 47 | $H_2NNHCOC_6H_5$ | $H_2NCH_2PO_3H$ | $—HNNHCOC_6H_5$ | $—NHCH_2PO_3H$ |
| 48 | $H_2NNHCO$—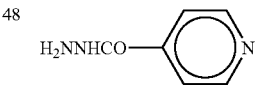 | $H_2NNHCONH_2$ | —NHNHCO—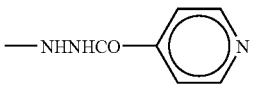 | $—NHNHCONH_2$ |
| 49 | $H_2NNHCOCH_3$ | 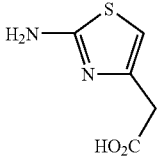 | $—NHNHCOCH_3$ | 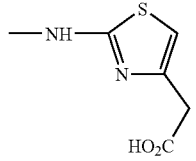 |
| 50 | $H_2NNHCO(CH_2)_6CH_3$ | $H_2N(CH_2)_5CO_2H$ | $—NHNHCO(CH_2)_6CH_3$ | $—NH(CH_2)_5CO_2H$ |
| 51 | $H_2NNHCO(CH_2)_6CH_3$ | $H_2N(CH_2)_5CH_3$ | $—NHNHCO(CH_2)_6CH_3$ | $—NH(CH_2)_5CH_3$ |
| 52 | $H_2NNHCO(CH_2)_6CH_3$ | 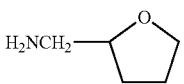 | $—NHNHCO(CH_2)_6CH_3$ | 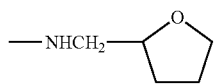 |

TABLE 3-continued

| Example | hydrazine | nucleophile | Resultant Compound -L-D | R¹ |
|---|---|---|---|---|
| 53 | H₂NNHCO(CH₂)₆CH₃ | H₂NCH₂CH₂CO₂H | —NHNHCO(CH₂)₆CH₃ | —NHCH₂CH₂CO₂H |
| 54 | H₂NNHCO—C₆H₄—C(CH₃)₂— with piperazine bearing two CH₂CH₂NH₂ groups | | —NHNHCO—C₆H₄—C(CH₃)₂— piperazine with CH₂CH₂—NH and NCH₂CH₂NH₂ | |
| 55 | H₂NNHCO—C₆H₄—C(CH₃)₂— | HN–piperazine–NCH₂CH₂NH₂ | —NHNHCO—C₆H₄—C(CH₃)₂— | —N–piperazine–NCH₂CH₂NH₂ |
| 56 | H₂NNHCO—C₆H₄—C(CH₃)₂— | H₂N(CH₂)₅OH | —NHNHCO—C₆H₄—C(CH₃)₂— | —NH(CH₂)₅OH |
| 57 | H₂NNHCO—C₆H₄—C(CH₃)₂— | H₂N(CH₂)₃N(CH₃)₂ | —NHNHCO—C₆H₄—C(CH₃)₂— | —NH(CH₂)₃N(CH₃)₂ |
| 58 | H₂NNHCO—C₆H₄—C(CH₃)₂— | H₂N(CH₂CH₂O)₂H | —NHNHCO—C₆H₄—C(CH₃)₂— | —NH(CH₂CH₂O)₂H |
| 59 | H₂NNHCO—C₆H₄—N(CH₃)₂ | H₂N(CH₂CH₂O)₂H | —NHNHCO—C₆H₄—N(CH₃)₂ | —NH(CH₂CH₂O)₂H |
| 60 | H₂NNHCO—C₆H₄—N(CH₃)₂ | H₂NCH₂—(tetrahydrofuran-2-yl) | —NHNHCO—C₆H₄—N(CH₃)₂ | —HNCH₂—(tetrahydrofuran-2-yl) |
| 61 | H₂NNHCO(CH₂)₆CH₃ | H₂NCH₂CH₂—piperazine—CH₂CH₂NH₂ | —NHNHCO(CH₂)CH₃ | —HNCH₂CH₂—piperazine—CH₂CH₂NH₂ |
| 62 | H₂NNCO—C₆H₄—C(CH₃)₂— | H₂NCH₂—(tetrahydrofuran-2-yl) | —NHNHCO—C₆H₄—N(CH₃)₂ | —HNCH₂—(tetrahydrofuran-2-yl) |

EXAMPLES 63 TO 125

The method of the Example specified in Table 4, column 2, was repeated except that in place of the compound specified in column 3 there was used an equimolar amount of the compound specified in column 4. The resultant compound was Formula (B) wherein Ar, $R^1$ and -L-D are as specified in Table 4.

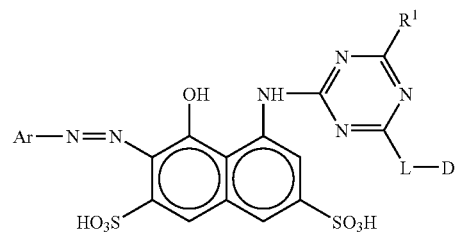

Formula (B)

TABLE 4

| Example | Previous Example | Previous Compound | Replaced by | Ar | $R^1$ | -L-D |
|---|---|---|---|---|---|---|
| 63 | 1 | 2-carboxy aniline | 2-sulpho-4-methyl aniline | 2-sulpho-4-methyl phenyl (CH$_3$, SO$_3$H) | —OH | —NHNHCOCONH$_2$ |
| 64 | 1 | 2-carboxy aniline | 1-sulpho-2-amino naphthalene | 1-sulpho-2-naphthyl | —OH | —NHNHCOCONH$_2$ |
| 65 | 5 | 2-carboxy aniline | 2-carboxy-4-methyl aniline | 2-carboxy-4-methyl phenyl (CH$_3$, CO$_2$H) | —OH | —NHNHCOC$_6$H$_5$ |
| 66 | 10 | 2-carboxy aniline | 2-carboxy-4-methyl aniline | 2-carboxy-4-methyl phenyl (CH$_3$, CO$_2$H) | —OH | —NHNHCOCH$_3$ |
| 67 | 4 | 2-carboxy aniline | 2-carboxy-4-methyl aniline | 2-carboxy-4-methyl phenyl (CH$_3$, CO$_2$H) | —OH | —NHNHC(O)-(4-pyridyl) |
| 68 | 1 | 2-carboxy aniline | 2-carboxy-4-methyl aniline | 2-carboxy-4-methyl phenyl (CH$_3$, CO$_2$H) | —OH | —NHCOCONH$_2$ |
| 69 | 3 | 2-carboxy aniline | 1-sulpho-2-amino naphthalene | 1-sulpho-2-naphthyl | —OH | —NHNHC(O)-(3-pyridyl) |
| 70 | 1 | 2-carboxy aniline | 1-sulpho-5-acetamido aniline | 5-acetamido-2-sulpho phenyl (CH$_3$CONH, SO$_3$H) | —OH | —NHNHCOCONH$_2$ |
| 71 | 7 | 2-carboxy aniline | 2-hydroxymethyl aniline | 2-hydroxymethyl phenyl (CH$_2$OH) | —OH | —NHNHCO-(2-furyl) |

TABLE 4-continued

| Example | Previous Example | Previous Compound | Replaced by | Ar | R¹ | -L-D |
|---|---|---|---|---|---|---|
| 72 | 6 | 2-carboxy aniline | 2-hydroxymethyl aniline | 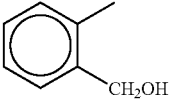 | —OH | —NHNHCO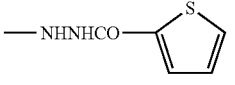 |
| 73 | 4 | 2-carboxy aniline | 2-hydroxymethyl aniline | 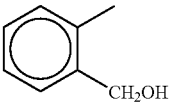 | —OH | —NHNHCO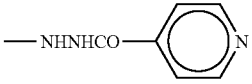 |
| 74 | 14 | 2-carboxy aniline | 2-hydroxymethyl aniline | 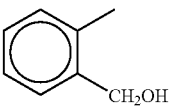 | —OH | —NHNHC$_6$H$_5$ |
| 75 | 23 | 2-carboxy aniline | 2-hydroxymethyl aniline | 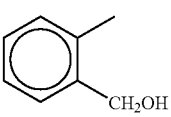 | —OH | —NHNHC$_6$H$_4$Cl |
| 76 | 10 | 2-carboxy aniline | 2-hydroxymethyl aniline | 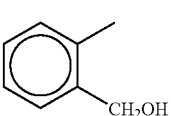 | —OH | —NHNHCOCH$_3$ |
| 77 | 13 | 2-carboxy aniline | 2-hydroxymethyl aniline | 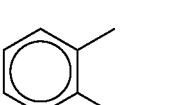 | —OH | —NHNHCOCH$_2$N(CH$_3$)$_3$ |
| 78 | 18 | 2-carboxy aniline | 2-hydroxymethyl aniline | 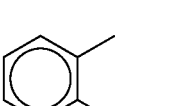 | —OH | —NHNHCH$_2$C$_6$H$_5$ |
| 79 | 19 | 2-carboxy aniline | 2-hydroxymethyl aniline | 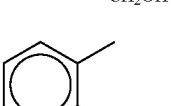 | —OH | —NHNHC$_6$H$_4$F |
| 80 | 7 | 2-carboxy aniline | 3,5-dicarboxy aniline | 3,5-dicarboxy phenyl | —OH | —NHNHCO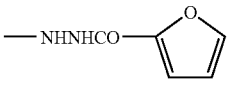 |
| 81 | 6 | 2-carboxy aniline | 3,5-dicarboxy aniline | 3,5-dicarboxy phenyl | —OH | —NHNHCO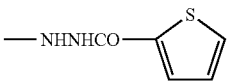 |
| 82 | 4 | 2-carboxy aniline | 3,5-dicarboxy aniline | 3,5-dicarboxy phenyl | —OH | —NHNHCO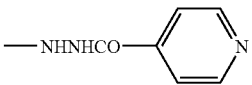 |
| 83 | 5 | 2-carboxy aniline | 3,5-dicarboxy aniline | 3,5-dicarboxy phenyl | —OH | —NHNHCOC$_6$H$_5$ |
| 84 | 24 | 2-carboxy aniline | 3,5-dicarboxy aniline | 3,5-dicarboxy phenyl | —OH | —NHNHCO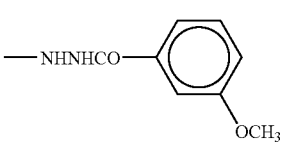 |

TABLE 4-continued

| Example | Previous Example | Previous Compound | Replaced by | Ar | R¹ | -L-D |
|---|---|---|---|---|---|---|
| 85 | 23 | 2-carboxy aniline | 3,5-dicarboxy aniline | 3,5-dicarboxy phenyl | —OH | 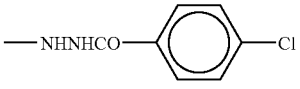 |
| 86 | 10 | 2-carboxy aniline | 3,5-dicarboxy aniline | 3,5-dicarboxy phenyl | —OH | —NHNHCOCH$_3$ |
| 87 | 26 | 2-carboxy aniline | 3,5-dicarboxy aniline | 3,5-dicarboxy phenyl | —OH | —NHNHCO |
| 88 | 18 | 2-carboxy aniline | 3,5-dicarboxy aniline | 3,5-dicarboxy phenyl | —OH | —NHNHCOCH$_2$C$_6$H$_5$ |
| 89 | 17 | 2-carboxy aniline | 3,5-dicarboxy aniline | 3,5-dicarboxy phenyl | —OH | —NHNHCH$_2$CH$_2$O |
| 90 | 2 | 2-carboxy aniline | 3,5-dicarboxy aniline | 3,5-dicarboxy phenyl | —OH | —NHNHCO(CH$_2$)$_6$CH$_3$ |
| 91 | 13 | 2-carboxy aniline | 3,5-dicarboxy aniline | 3,5-dicarboxy phenyl | —OH | —NHNHCOCH$_2$N$^+$(CH$_3$)$_3$ |
| 92 | 21 | 2-carboxy aniline | 3,5-dicarboxy aniline | 3,5-dicarboxy phenyl | —OH | —NHNHCH$_2$C$_6$H$_5$ |
| 93 | 10 | 2-carboxy aniline | 2-sulpho-4-methyl aniline | 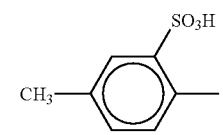 | —OH | —NHNHCOCH$_3$ |
| 94 | 13 | 2-carboxy aniline | 2-sulpho-4-methyl aniline | 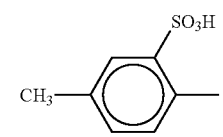 | —OH | —NHNHCON$^+$(CH$_3$)$_3$ |
| 95 | 27 | 2-carboxy aniline | 2-sulpho-4-methyl aniline | 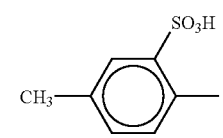 | —OH | 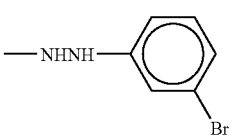 |
| 96 | 12 | 2-carboxy aniline | 1-sulpho-2-methyl aniline | 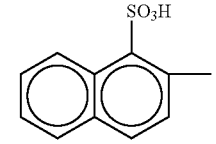 | —OH | 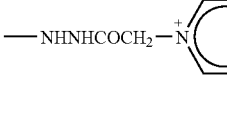 |
| 97 | 13 | 2-carboxy aniline | 1-sulpho-2-amino naphthalene | 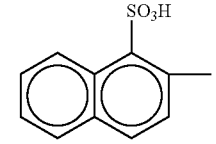 | —OH | —NHNHCON$^+$(CH$_3$)$_3$ |
| 98 | 4 | 2-carboxy aniline | 3-carboxy-6-methoxy aniline | 3-carboxy-6-methoxy phenyl | —OH | 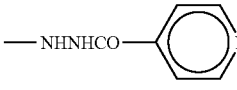 |
| 99 | 7 | 2-carboxy aniline | 3-carboxy-6-methoxy aniline | 3-carboxy-6-methoxy phenyl | —OH | 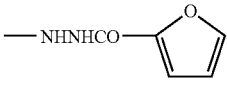 |
| 100 | 20 | 2-carboxy aniline | 2-sulpho-4-methyl aniline | 2-sulpho-4-methyl phenyl | —OH | 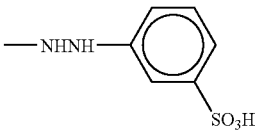 |

TABLE 4-continued

| Example | Previous Example | Previous Compound | Replaced by | Ar | R¹ | -L-D |
|---|---|---|---|---|---|---|
| 101 | 4 | 2-carboxy aniline | 2-sulpho-4-methyl aniline | 2-sulpho-4-methyl phenyl | —OH | 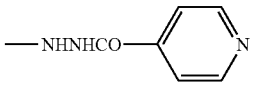 |
| 102 | 18 | 2-carboxy aniline | 2-sulpho-4-methyl aniline | 2-sulpho-4-methyl phenyl | —OH | —NHNHCOCH$_2$C$_6$H$_5$ |
| 103 | 21 | 2-carboxy aniline | 2-sulpho-4-methyl aniline | 2-sulpho-4-methyl phenyl | —OH | —NHNHCH$_2$C$_6$H$_5$ |
| 104 | 19 | 2-carboxy aniline | 2-sulpho-4-methyl aniline | 2-sulpho-4-methyl phenyl | —OH | 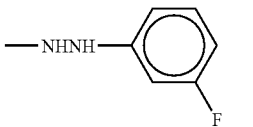 |
| 105 | 28 | 2-carboxy aniline | 2-sulpho-4-methyl aniline | 2-sulpho-4-methyl phenyl | —OH | —NHNHC(CH$_3$)$_3$ |
| 106 | 14 | 2-carboxy aniline | 2-sulpho-5-amino aniline | 2-sulpho-5-amino phenyl | —OH | —NHNHC$_6$H$_5$ |
| 107 | 14 | 2-carboxy aniline | 2-sulpho-4-methoxy aniline | 2-sulpho-4-methoxy phenyl | —OH | —NHNHC$_6$H$_5$ |
| 108 | 14 | 2-carboxy aniline | 2-carboxy-4-methyl aniline | 2-carboxy-4-methyl phenyl | —OH | —NHNHC$_6$H$_5$ |
| 109 | 2 | 2-carboxy aniline | 2-hydroxy methyl aniline | 2-hydroxy methyl phenyl | —OH | —NHNHCO(CH$_2$)$_6$CH$_3$ |
| 110 | 28 | 2-carboxy aniline | 2-hydroxy methyl aniline | 2-hydroxy methyl phenyl | —OH | —NHNHC(CH$_3$)$_3$ |
| 111 | 4 | 2-carboxy aniline | 1-sulpho-2-amino napthalene | 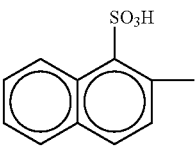 | —OH | 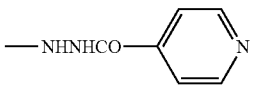 |
| 112 | 10 | 2-carboxy aniline | 1-sulpho-2-amino napthalene | 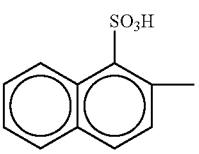 | —OH | —NHNHCOCH$_3$ |
| 113 | 20 | 2-carboxy aniline | 1-sulpho-2-amino napthalene | 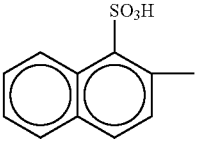 | —OH | 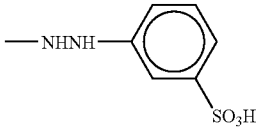 |
| 114 | 18 | 2-carboxy aniline | 1-sulpho-2-amino napthalene | 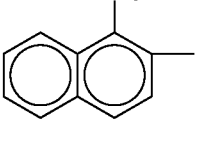 | —OH | —NHNHCOCH$_2$C$_6$H$_5$ |
| 115 | 2 | 2-carboxy aniline | 1-sulpho-2-amino napthalene | 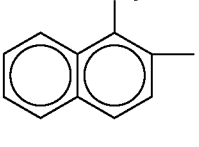 | —OH | —NHNHCO(CH$_2$)$_6$CH$_3$ |

TABLE 4-continued

| Example | Previous Example | Previous Compound | Replaced by | Ar | R¹ | -L-D |
|---|---|---|---|---|---|---|
| 116 | 21 | 2-carboxy aniline | 1-sulpho-2-amino napthalene | 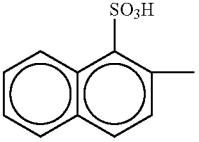 | —OH | —NHNHCH$_2$C$_6$H$_5$ |
| 117 | 19 | 2-carboxy aniline | 1-sulpho-2-amino napthalene | 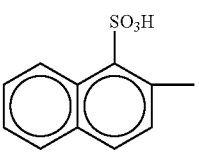 | —OH | 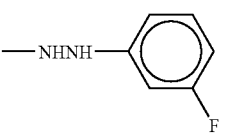 |
| 118 | 28 | 2-carboxy aniline | 1-sulpho-2-amino napthalene | 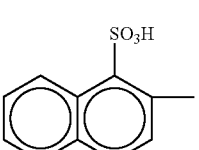 | —OH | —NHNHC(CH$_3$)$_3$ |
| 119 | 19 | 2-carboxy aniline | 3,5-dicarboxy aniline | 3,5-dicarboxy phenyl | —OH | 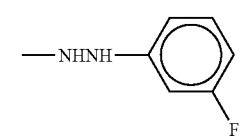 |
| 120 | 28 | 2-carboxy aniline | 3,5-dicarboxy aniline | 3,5-dicarboxy phenyl | —OH | —NHNHC(CH$_3$)$_3$ |
| 121 | 14 | 2-carboxy aniline | 3,5-dicarboxy aniline | 3,5-dicarboxy phenyl | —OH | —NHNHC$_6$H$_5$ |
| 122 | 2 | 2-carboxy aniline | 3-carboxy-6-methoxy aniline | 3-carboxy-6-methoxy phenyl | —OH | —NHNHCO(CH$_2$)$_6$CH$_3$ |
| 123 | 24 | 2-carboxy aniline | 1-sulpho-2-amino napthalene | 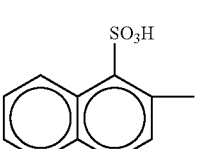 | —OH | 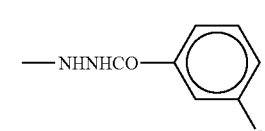 |
| 124 | 26 | 2-carboxy aniline | 1-sulpho-2-amino napthalene | 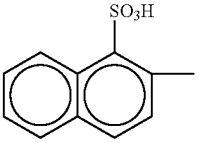 | —OH | —NHNHCOCH$_2$CN |
| 125 | 41 | 2-carboxy aniline | 1-sulpho-2-amino napthalene | 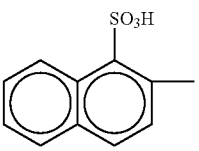 | —NHCH$_2$PO$_3$H | —NHNHCOC$_6$H$_5$ |

EXAMPLES 126 TO 136

The method of Example 7 was represented except that in stage (a) place of 2-carboxy aniline the compound specified in Table 5, column 3 was used in an equimolar amount; and in stage (b) in place of oxamic acid there was used an equimolar amount of the hydrazine in Table 5, column 6.

TABLE 5

| Ex | Previous Compound | Replaced by | Ar | Previous Compound | Replaced by | -L-D |
|---|---|---|---|---|---|---|
| 126 | 2-carboxy aniline | 1-sulpho-2-amino napthalene | 1-sulpho-2-amino naphthalene (SO₃H on naphthalene) | — | NH₂NHCO—C₆H₄—Cl | —NHNHCO—C₆H₄—Cl |
| 127 | 2-carboxy aniline | 2-hydroxy methyl aniline | 2-hydroxy methyl phenol | — | phthalimide-NH₂ | phthalimide-NH— |
| 128 | 2-carboxy aniline | 2-sulpho-4-methyl aniline | 2-sulpho-4-methyl phenyl | — | NH₂NH—C₆H₄—SO₃H | —NHNH—C₆H₄—SO₃H |
| 129 | 2-carboxy aniline | 2-sulpho-4-methyl aniline | 2-sulpho-4-methyl phenyl | — | NH₂NHCO—C₆H₄—OH | —NHNHCO—C₆H₄—OH |
| 130 | 2-carboxy aniline | 2-sulpho-4-methyl aniline | 2-sulpho-4-methyl phenyl | — | NH₂NH—(2-pyridyl) | —NHNH—(2-pyridyl) |
| 131 | 2-carboxy aniline | 2-sulpho-4-methyl aniline | 2-sulpho-4-methyl phenyl | — | phthalimide-NH₂ | phthalimide-NH— |
| 132 | 2-carboxy aniline | 3-carboxy-6-methoxy aniline | 3-carboxy-6-methoxy phenyl | — | NH₂NHCOCONH₂ | —NHNHCOCONH₂ |

TABLE 5-continued

| Ex | Previous Compound | Replaced by | Ar | Previous Compound Replaced by | -L-D |
|---|---|---|---|---|---|
| 133 | 2-carboxy aniline | 2-sulpho-4-methyl aniline | 2-sulpho-4-methyl phenyl | NH₂NHCO—⟨phenyl-OH⟩ (meta) | —NHNHCO—⟨phenyl-OH⟩ (meta) |
| 134 | 2-carboxy aniline | 2-sulpho-4-methyl aniline | 2-sulpho-4-methyl phenyl | H₂N—⟨piperazine-N—CH₃⟩ | —NHN—⟨piperazine-N—CH₃⟩ |
| 135 | 2-carboxy aniline | 2,5-dicarboxy aniline | 2,5-dicarboxy phenyl | NH₂NHCO—⟨phenyl-OH⟩ (meta) | —NHNHCO—⟨phenyl-OH⟩ (meta) |
| 136 | 2-carboxy aniline | — | (structure shown below) | —NH₂NHCOCONH₂ | —NHNHCOCONH₂ |

Structure for Ex 136:

A 1,3,5-triazine ring bearing OH, linked via —NH—NH—C(O)—C(O)—NH₂ on one position, and linked to a phenyl ring (bearing SO₃H and NH₂ substituents) on another position. The same substituent pattern appears on both sides as drawn.

EXAMPLES 137 TO 141

The method of Example 7 was repeated except that in stage (a) in place of 2-carboxy aniline the compound specified in Table 6, column 2 was used in an equimolar amount; in stage (b) in place of oxamic acid there was used an equimolar amount of the hydrazine in Table 6, column 7; and stage (c) was replaced by condensation of the product of stage (b) (1 part) in water (10 parts) at 85° C. with the nucleophile listed in Table 6, column 5.

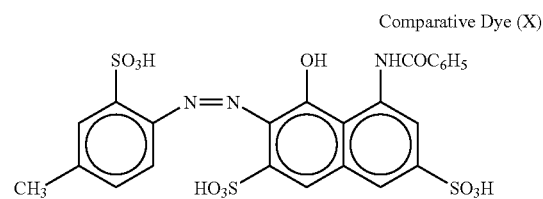

Comparative Dye (X)

TABLE 6

| Ex | Previous Compound | Replaced by | Ar | Nucleophile | $R^4$ |
|---|---|---|---|---|---|
| 137 | 2-carboxy aniline | 3-carboxy-6-methoxy aniline | 3-carboxy-6-methoxy phenyl | $NH_2CH_2CH_2CH(CH_3)_2$ | $-NHCH_2CH_2CH(CH_3)_2$ |
| 138 | 2-carboxy aniline | 1-sulpho-2-amino napthalene | (1-sulpho-2-naphthyl) | $NH_2CH_2CH(OH)CH_2OH$ | $-NHCH_2CH(OH)CH_2OH$ |
| 139 | 2-carboxy aniline | 1-sulpho-2-amino napthalene | (1-sulpho-2-naphthyl) | $NH_2$-C$_6$H$_4$-$PO_3H_2$ | $-NH$-C$_6$H$_4$-$PO_3H_2$ |
| 140 | 2-carboxy aniline | 1-sulpho-2-amino napthalene | (1-sulpho-2-naphthyl) | $NH_2NHCOC_6H_5$ | $-NHNHCOC_6H_5$ |
| 141 | 2-carboxy aniline | 1-sulpho-2-amino napthalene | (1-sulpho-2-naphthyl) | $NH_2PO_3H_2$ | $-NHPO_3H_2$ |

| Ex | Previous Compound | Replaced by | -L-D |
|---|---|---|---|
| 137 | — | $NH_2NHCO(CH_2)_6CH_3$ | $-NHNHCO(CH_2)_6CH_3$ |
| 138 | — | $NH_2NHCOCH_2N^+(CH_3)_3$ | $-NHNHCOCH_2N^+(CH_3)_3$ |
| 139 | — | $NH_2NHCOCH_3$ | $-NHNHCOCH_3$ |
| 140 | — | $NH_2NHCO(CH_2)_6CH_3$ | $-NHNHCO(CH_2)CH_3$ |
| 141 | — | $NH_2NHCO$-(3-pyridyl) | $-NHNHCO$-(3-pyridyl) |

EXAMPLE 142

Inks and Ink Jet Printing

The compound from Example 7 was made up into an ink according to the formulation shown below. For comparison purposes a compound lacking the hydrazo (—NH—NH—) group, shown below as Comparative Dye (X), was made into an analogous ink:

The ink Formulation had a pH8 and the following components (all parts by weight):

| Component | Amount |
|---|---|
| Compound | 3.5 |
| 2-pyrrolidone | 5 |

-continued

| Component | Amount |
|---|---|
| thiodiglycol | 5 |
| Surfynol ™ 4651 | |
| Water | 85.5 |

The inks were placed in a Canon 4300 ink jet printer and printed onto the papers indicated in Table 7 below. After drying, the light fastness of the prints were measured by radiating the papers in an Atlas Ci 5000 Weatherometer and recording the level of fade ($\Delta E$). A high value of $\Delta E$ indicates low light fastness and a low value of $\Delta E$ indicates high light fastness. The results of these measurements are shown in Table 7 below:

TABLE 7

| Compound | Paper | $\Delta E$ |
|---|---|---|
| Example 1 | Canon HG 201 | 8 |
| Comparative Dye (X) | Canon HG 201 | 22 |

Table 7 shows that compound containing a hydrazine or hydrazide group has a higher light fastness (lower $\Delta E$) than Comparative Dye (X).

EXAMPLE 143

Preparation of Compound (A2)

Compound (A2) was prepared as follows:

1-Amino-8-hydroxy-3,6-disulpho-2-(2-carboxy phenylazo) naphthalene (prepared as described in European Patent application number EP682088 A1 page 17, lines 50 to 53 (5 parts) was suspended in water (50 parts) and dissolved by the addition of 2M sodium hydroxide solution to pH7. The solution was cooled to 0–5° C. and a slurry of cyanuric chloride (5.5 part) in water (50 mls) containing calsolene oil (0.1 g). The resulting mixture was stirred for 2 hours at 0–5° C. and the pH of the mixture was maintained at 6.5 to 7 by the addition of 2M sodium hydroxide solution as required. Oxalic acid dihydrazide (2.74 parts) was added and the pH of the mixture raised to 8.5 with 2M sodium hydroxide solution. The temperature was allowed to rise to 20–25° C. and the mixture stirred at pH 8.5/20–25° C. for 2.5 hours. 1,4-diazabicyclo[2.2.2]octane (0.2 g) was added and the pH was raised to 10.5–11.0 with 2M sodium hydroxide solution. The mixture was heated to 80–85° C. and held there until the hydrolysis was complete. Sodium chloride was added to 10% w/v and the pH brought to 7 with concentrated hydrochloric acid. The mixture was cooled to 60° C., the product was filtered off and washed with 15% w/v sodium chloride solution. The wet product was dissolved in dilute sodium hydroxide solution and dialysed in visking tubing to low conductivity. The dialysed solution was screened through a 0.7 μm filter and the solution evaporated to dryness at 50° C. to give the title compound.

EXAMPLES 144 TO 148

The method of Example 143 was repeated except that in place of the component(s) listed in Table 8, column 2, there was used an equimolar amount of the component(s) listed in column 3. The resultant compound was of Formula (B1) wherein Ar and $L^1$ are as shown in Table 8.

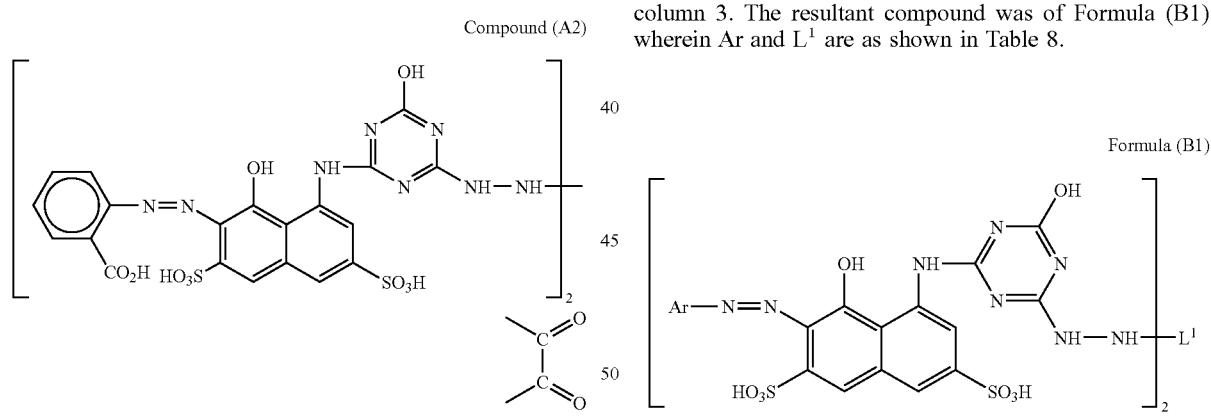

Compound (A2)

Formula (B1)

TABLE 8

| | Component from | | Resultant Compound | |
|---|---|---|---|---|
| Example | Example 143 | Replaced by | Ar | $L^1$ |
| 144 | (CONHNH$_2$)$_2$ | [(CH$_2$)$_2$CONHNH$_2$]$_2$ | 2-carboxyphenyl | —CO(CH$_2$)$_4$—CO— |
| 145 | (CONHNH$_2$)$_2$ 2-Carboxyaniline | [(CH$_2$)$_2$CONHNH$_2$]$_2$ 1-sulpho-2-amino naphthalene | 1-sulphonaphth-2-yl | —CO(CH$_2$)$_4$—CO— |
| 146 | 2-Carboxyaniline | 1-sulpho-2-aminonaphthalene | 1-sulphonaphth-2-yl | —COCO— |

TABLE 8-continued

| | Component from | | Resultant Compound | |
|---|---|---|---|---|
| Example | Example 143 | Replaced by | Ar | $L^1$ |
| 147 | $(CONHNH_2)_2$ | 2-methyl-4,5-di(CONHNH$_2$)imidazole | 2-carboxyphenyl | 2-methyl-4,5-di(CO—)imidazole linker |
| 148 | $(CONHNH_2)_2$ 2-Carboxyaniline | 1,4-di(CONHNH$_2$)benzene 1-sulpho-2-aminonaphthalene | 1-sulphonaphth-2-yl | 1,4-di(CO—)benzene linker |

EXAMPLE 149

Preparation of:

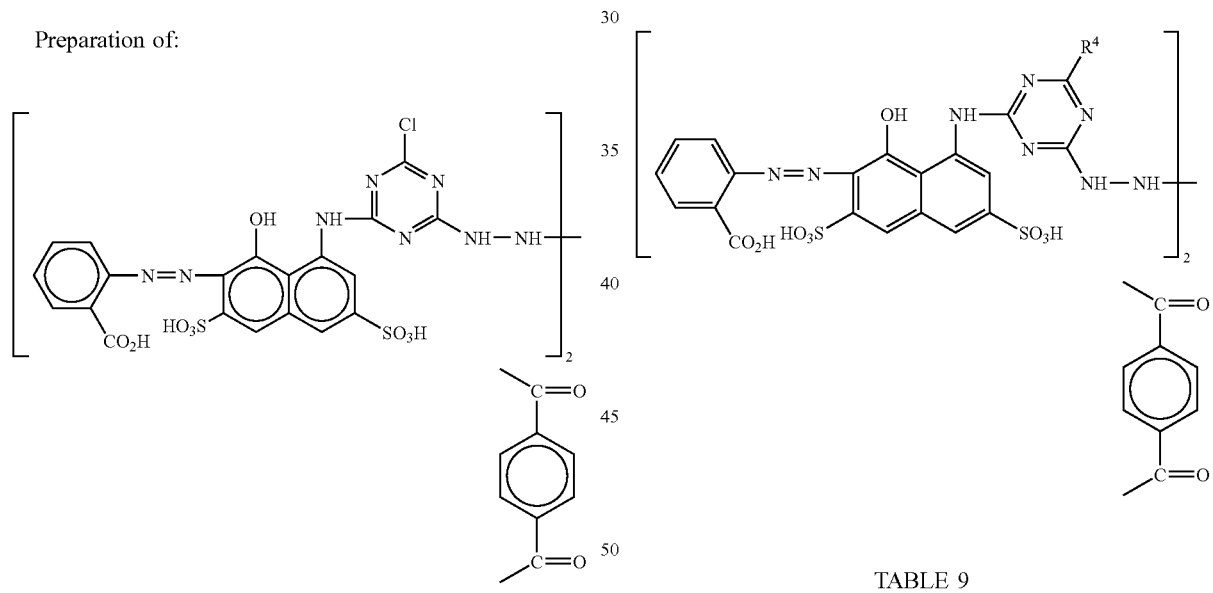

The title compound was prepared as described in Example 143 except that in place of oxalic acid dihydrazide there was used an equimolar amount of pterephthaloyl dihydrazide and the hydrolysation step was omitted. The resultant compound had a λmax 548 nm.

EXAMPLES 150 To 155

The compounds of Formula (C) described in Table 9 below were prepared by condensing the compound resulting from Example 149 (1 part) in water (10 parts) with an excess of the amine indicated in Table 9, column 2 (3 parts) at 80° C. for 4 hours.

TABLE 9

| | | Resultant Compound | |
|---|---|---|---|
| Example | Amine | $R^4$ | λmax (nm) |
| 150 | decylamine | —NH(CH$_2$)$_9$CH$_3$ | 542 |
| 151 | hexylamine | —NH(CH$_2$)$_5$CH$_3$ | 544 |
| 152 | morpholine | Morpholine | 540 |
| 153 | octylamine | —NH(CH$_2$)$_7$CH$_3$ | 544 |
| 154 | H$_2$NCH$_2$CH$_2$CH(CH$_3$)$_2$ | —NHCH$_2$CH$_2$CH(CH$_3$)$_2$ | 542 |
| 155 | furfurylamine | —NH—CH$_2$-(tetrahydrofuran) | 540 |

EXAMPLES 156 TO 159

The method of Example 143 was repeated except that (i) oxalic acid dihydrazide was replaced by an equimolar amount of $[(CH_2)_2CONHNH_2]_2$ and the hydrolysation step was replaced by condensation of the resultant chlorotriazine compound (1 part) with the amine indicated in Table 10, column 2 below (3 parts) in water at 80° C. for 4 hours.

The resultant compounds were of Formula (D) wherein $R^4$ is as defined in Table 10 below.

TABLE 10

Formula (D)

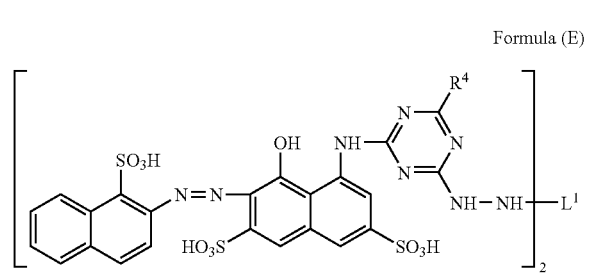

| Example | Amine | Resultant Compound $R^4$ | λmax (nm) |
|---|---|---|---|
| 156 | $H_2NCH_2CHOHCH_2OH$ | —$NHCH_2CHOHCH_2OH$ | 548 |
| 157 | $H_2NCH_2CH_2SO_3H$ | —$NHCH_2CH_2SO_3H$ | 549 |
| 158 | $CH_3NHCH_2CO_2H$ | —$N(CH_3)CH_2CO_2H$ | 547 |
| 159 | 2-carboxypyrrole | (pyrrolidine-2-CO₂H) | 546 |

EXAMPLE 160

Preparation of the compound of Formula (E) wherein $R^4$ is Cl and $L^1$ is —$CO(CH_2)_4CO$—

Formula (E)

Stage (i)

2-Napthylamine-1-sulphonic acid (67.84 g) was added to water (500 ml) and cooled to 0–5° C. Concentrated HCl (150 ml) was then added followed by 2N $NaNO_2$ (150 ml). The solution was stirred for 1 hour at 0–5° C. and excess $NaNO_2$ was destroyed by addition of sulphamic acid.

To the above solution was added 1-acetamido-8-napthol-3,6-disulphonic acid (109.83 g) in water (500 ml). The pH was then raised to 7 by addition of a concentrated solution of NaOH and the solution was stirred for 3 hours at 0 to 5° C. The solution was then adjusted to pH11 by addition of NaOH pellets and was heated to 85° C. for 6 hours.

The pH was then reduced to 7.0 by addition of concentrated HCl and the solution was salted to 20% with NaCl. The resulting precipitate was filtered off, washed and dried.

Stage (ii)

The product of stage (i) above (86.5 g) was dissolved in water (800 ml). Cyanuric chloride (19.36 g) was dissolved in acetone (200 ml) and added to ice/water (300 g). To this was added the solution of the product of stage (i) allowing the pH to fall. The resulting solution was stirred for 2 hours at 0–5° C. The pH was then raised to 7.0 by addition of 2N NaOH solution and the solution was allowed to self warm to room temperature. This gave a dichorotriazine compound.

Stage (iii)

Adipic dihydrazide (0.5 parts) was added to a solution of the dichlorotriazine product from stage (ii) (1 part) in water (10 parts) and the pH of the mixture raised to 8.5 with 2M sodium hydroxide solution. The temperature was allowed to rise to 20–25° C. and the mixture stirred at pH 8.5/20–25° C. for 2.5 hours to give the title product.

EXAMPLE 161 TO 166

The resultant compounds were of Formula (E) wherein $R^4$ and $L^1$ are as described in Table 11 below. These compounds were prepared by condensing 3 parts of the nucleophile listed in column 2 of Table 11 with 1 part of the product of Example 160 in water (10 parts) at 85° C. for 4 hours.

TABLE 11

| Example | Nucleophile | Resultant Compound R⁴ | L¹ |
|---|---|---|---|
| 161 | $H_2NCH_2CH_2SO_3H$ | —$NHCH_2CH_2SO_3H$ | —$CO(CH_2)_4CO$— |
| 162 | $H_2NCH_2CHOHCH_2OH$ | —$NHCH_2CHOHCH_2OH$ | —$CO(CH_2)_4CO$— |
| 163 | $CH_3NHCH_2CO_2H$ | —$N(CH_3)CH_2CO_2H$ | —$CO(CH_2)_4CO$— |
| 164 | 2-carboxypyrrole | (pyrrolidine-2-carboxylic acid structure) | —$CO(CO_2)_4CO$— |
| 165 | $H_2N(CH_2CH_2O)_2H$ | —$NH(CH_2CH_2O)_2H$ | —$CO(CO_2)_4CO$— |
| 166 | 3-N-morpholinoprop-1-ylamine | —$NH(CH_2)_3$—N(morpholine) | —$CO(CH_2)_4CO$— |
| 167 | $HS(CH_2)_3SO_3H$ | —$S(CH_2)_3SO_3H$ | —$CO(CH_2)_4CO$— |

EXAMPLE 168

Preparation of the Compound of Formula (E) wherein R⁴ is $HNCH_2CHOHCH_2OH$ and L¹ is —COCO—

The method of Example 160 was repeated except that in place of $[(CH_2)_2CONHNH_2]_2$ there was used an equimolar amount of (oxalyl dihydrazide)₂. The resultant chlorotriazine compound (1 part) in water (10 parts) was condensed with $H_2NCH_2CHOHCH_2OH$ (2 parts) at 80° C. for 4 hours to give the compound of Formula (E) wherein R⁴ is $HNCH_2CHOHCH_2OH$ and L is —COCO— having λmax at 542 nm.

EXAMPLE 169

Preparation of the Compound of Formula (E) wherein R⁴ is $HNCH_2CHOHCH_2OH$ and L¹ is —$CO(CH_2)_2CO$—

The method of Example 168 was repeated except that in place of $[(CH_2)_2CONHNH_2]_2$ there was used on equimolar amount of $[(CH_2)CONHNH_2]_2$. The resultant compound had a λmax at 545 nm.

Example 170

Preparation of the Compound of Formula (E) wherein R⁴ is 2-carboxy-N-imidazolyl and L¹ is —$CO(CH_2)_2$—CO The method of Example 160 was repeated except that in place of $[(CH_2)_2CONHNH_2]_2$ there was used an equimolar amount of $[(CH_2)CONHNH_2]_2$. The resultant chlorotriazine compound (1 part) in water was condensed with 2-carboxy imidazole (2 parts) at 80° C. for 4 hours to give the title compound.

EXAMPLE 171

Preparation of the Compound of the Formula (F) wherein R⁴ is —$CO(CH_2)_6CH_3$.

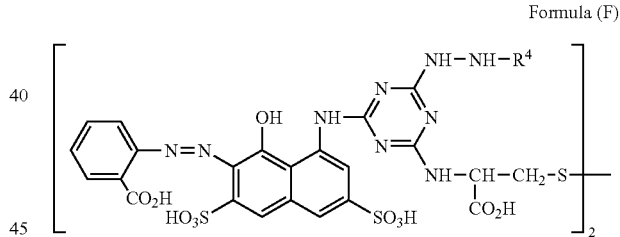

Formula (F)

1-Amino-8-hydroxy-3,6-disulpho-2-(2-carboxy phenylazo)naphthalene (prepared as described European Patent application EP682088 A1, page 17, lines 50 to 53) (5 parts) was suspended in water (50 parts) and dissolved by the addition of 2M sodium hydroxide solution to pH7. The solution was cooled to 0–5° C. and a slurry of cyanuric chloride (5.5 part) in water (50 mls) containing calsolene oil (0.1 g). The resulting mixture was stirred for 2 hours at 0–5° C. and the pH of the mixture was maintained at 6.5–7 by the addition of 2M sodium hydroxide solution as required, to give the dichlorotriazinyl compound. Cystine (2.74 parts) was added and the pH of the mixture raised to 8.5 with 2M sodium hydroxide solution. The temperature was allowed to rise to 20–25° C. and the mixture stirred at pH 8.5/20–25° C. for 2.5 hours. Octanoic hydrazide (15 parts) was added and the pH was raised to 10.5–11.0 with 2M sodium hydroxide solution. The mixture was heated to 80–85° C. and held there until the reaction was complete. Sodium chloride was added to 10% w/v and the pH brought to 7 with concentrated hydrochloric acid. The mixture was cooled to 60° C., the product was filtered off and washed with 15% w/v sodium chloride solution. The wet product was dissolved in dilute sodium hydroxide solution and dialysed in visking tubing to low conductivity. The dialysed solution was screened through a 0.71 µm filter and the solution evaporated to dryness at 50° C. to give the title compound having a λmax at 549 nm.

EXAMPLE 172

Preparation of the Compound of Formula (F) wherein $R^4$ is —$COCH_3$

The method of Example 171 was repeated except that in place of octanoic hydrazide there was used an equimolar amount of ethanoic hydrazide.

The resultant compound had a λmax at 545 nm.

EXAMPLE 173

Preparation of the Compound of the Formula (G) wherein T is $C_6H_5$ and $L^1$ is —$CH(CO_2H)(CH_2)_3$—

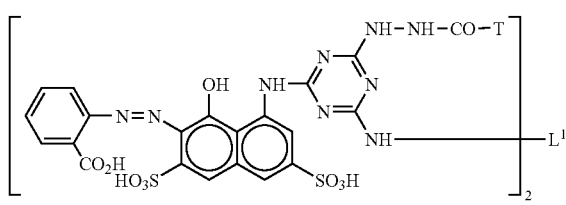

Formula (G)

The method of Example 171 was repeated except that in place of cystine there was used ornithine and in place of octanoic hydrazide there was used benzoyl hydrazide.

The resultant compound had a λmax at 549 nm.

EXAMPLE 174

Preparation of the Compound of Formula (G) wherein T is $C_6H_5$ and $L^1$ is —$CH_2CHOHCH_2$—

The method of Example 173 was repeated except that in place of ornithine there was used an equimolar amount of 1,3,-diamino-2-hydroxy propane.

EXAMPLE 175

Preparation of the Compound of Formula (G) wherein T is $CH_3$ and $L^1$ is —$CH_2CHOHCH_2$—

The method of Example 173 was repeated except that in place of ornithine there was used an equimolar amount of 1,3-diamino-2-hydroxy propane and in place of benzoyl hydrazide there was used an equimolar amount of ethanoyl hydrazide.

The resultant compound had a λmax at 551 nm.

EXAMPLE 176

Preparation of the Compound of Formula (G) wherein T is 4-t-butyl phenyl and $L^1$ is —$(CH_2)_2$—$N(CH_2CH_2)_2N$—$(CH_2)_2$—

The method of Example 173 was repeated except that in place of ornithine there was used an equimolar amount of diethylene triamine and in place of benzoyl hydrazide there was used an equimolar amount of tert-butylbenzoic hydrazide.

The resultant compound had a λmax at 553 nm.

EXAMPLE 177

The compound from Example 143 and Comparative Dye (X) were made up into an ink according to the general formulation described in Example 142 above.

The inks were placed in a Canon 4300 ink jet printer and printed onto the papers indicated in Table 12 below. After drying, the light-fastness of the prints were measured by the general method described in Example 142 above and the results are shown in Table 12 below:

TABLE 12

| Dye | Paper | ΔE |
| --- | --- | --- |
| Compound of Example 143 | Canon GP 201 | 6 |
| Comparative Dye (X) | Canon GP 201 | 33 |

Table 12 shows that Compound from Example 143 has higher light-fastness (lower ΔE) than Comparative Dye (X).

EXAMPLE 178

Preparation of Compound (A3)

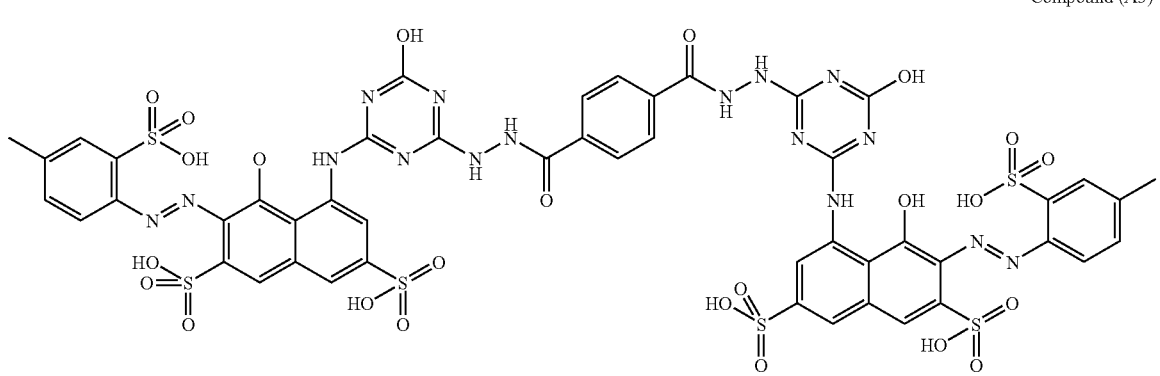

Compound (A3)

Compound (A3) was prepared as follows:

Stage (a):

4-methyl-2-sulpho aniline (56 g) was added to water (500 ml) and cooled to 0–5° C. Concentrated HCl (150 ml) was then added followed by 2N NaNO$_2$ (150 ml). The solution was stirred for 1 hour at 0–5° C. and excess NaNO$_2$ was destroyed by addition of sulphamic acid.

To the above solution was added 1-acetamido-8-napthol-3,6-disulphonic acid (109.83 g) in water (500 ml). The pH was then raised to 7 by addition of a concentrated solution of NaOH and the solution was stirred for 3 hours at 0–5° C. The solution was then adjusted to pH11 by addition of NaOH pellets and was heated to 85° C. for 6 hours.

The pH was then reduced to 7 by addition of concentrated HCl and the solution was salted to 20% with NaCl. The resulting precipitate was filtered-off, washed and dried.

Stage (b):

The product of stage (a) (29.0 g, 0.05 moles) was suspended in water (800 mls) and dissolved by the addition of sodium hydroxide (2M) to pH7. The mixture was then cooled to <5° C. and a slurry of cyanuric chloride (10.2 g, 0.055 moles) in water (50 mls) and calsolene oil (0.1 g) was added. The resultant mixture was stirred at below 5° C. for 2 hours maintaining the pH of the mixture at between pH 6.5 and 7.0 by the addition of sodium hydroxide solution (2M) as required.

Stage (c):

Pterepthaloyl hydrazide (from Aldrich) (4.8 g (0.0275 moles)) was added to the product of stage (a) and the pH of the mixture raised to pH 8.5 using sodium hydroxide solution (2M). The temperature of the reaction mixture was allowed to rise to 20–25° C. and then the mixture was stirred at pH 8.5 at 20–25° C. for 2.5 hours.

1.4-diazabicyclo[2,2,2]octane was added and the pH of the mixture was raised to pH 10.5–11.0 with sodium hydroxide solution (2M). The mixture was then heated to 80–85° C. and maintained at the temperature until the hydrolysis reaction was complete.

Sodium chloride solution was then added 1% to 10% w/v and the pH of the mixture lowered to pH 7 using concentrated hydrochloric acid.

The mixture was then cooled to 60° C. and the product filtered and washed with 15% w/v sodium chloride solution.

The resultant wet product was subsequently dissolved in dilute sodium hydroxide solution and dialysed in visking tubing to low conductivity.

The dialysed solution was screened through a 0.7 μm filter and the solution evaporated to dryness at 50° C. to give Compound (A3) having a λmax at 551 nm.

EXAMPLE 179

Compound (B2)

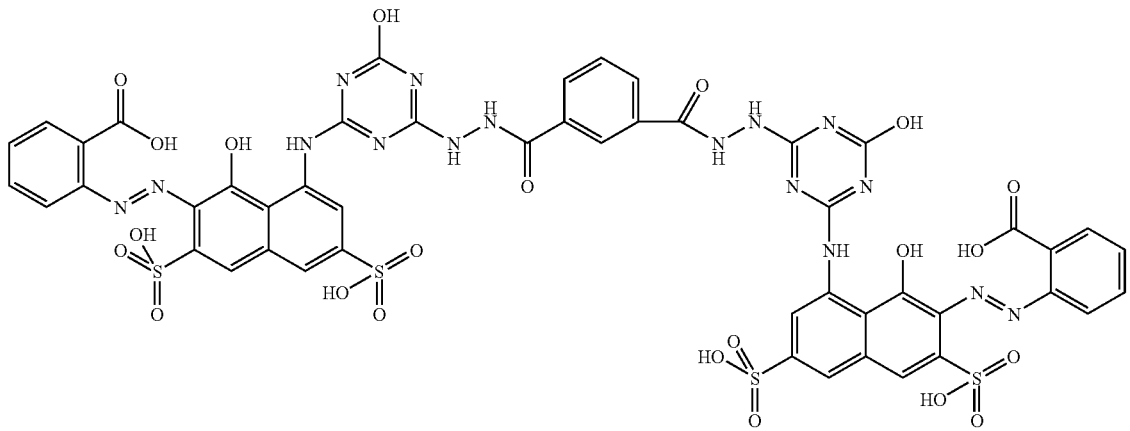

Compound (B2) was prepared by the method described in Example 178 except that in place of 4-methyl-2-sulphoaniline there was used 2-carboxyaniline and in place of pterephthaloyl hydrazide there was used isophthaloyl hydrazide.

EXAMPLE 180

Compound (C1)

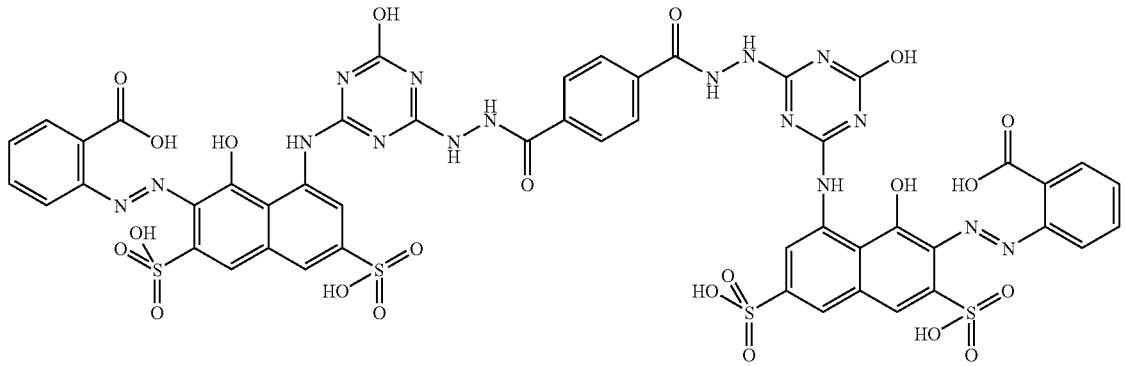

Compound (C1) was prepared by the method described in Example 178 except that in place of 4-methyl-2-sulphoaniline there was used 2-carboxy aniline.

EXAMPLE 181

Compound (E1) was prepared according to the method of Example 178 except that in place of 4-methyl-2-sulphoaniline there was used 4-methyl-2-carboxyaniline to give Compound (E1) having a λmax at 550 nm.

Compound (D1)

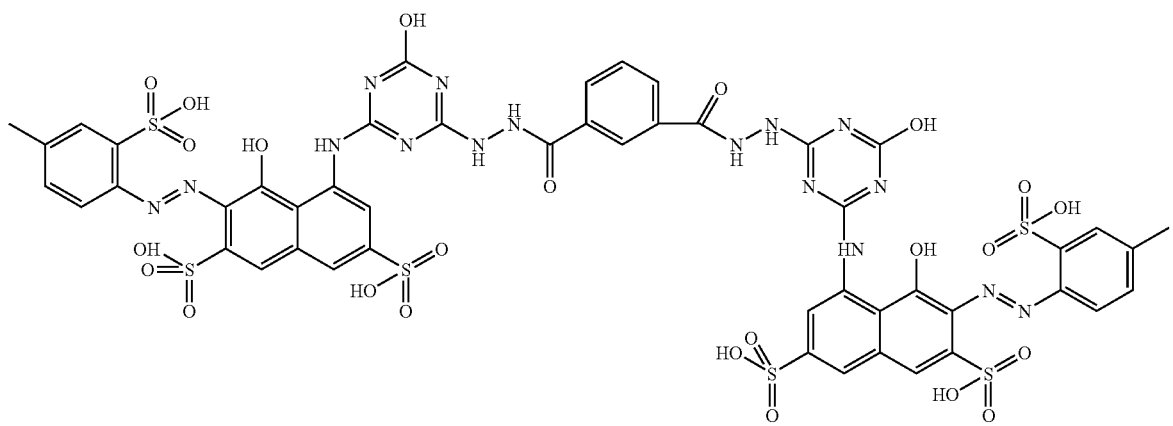

Compound (D1) was prepared according to the method of Example 178 except that in place of pterephthaloyl hydrazide there was used isophthaloyl hydrazide.

EXAMPLE 182

EXAMPLE 183

Compounds (B2) and (C1) from Examples 179 and 180 and Comparative Dye (X) respectively were made up into an ink according to the general formulation described in Example 142 above.

Compound (E1)

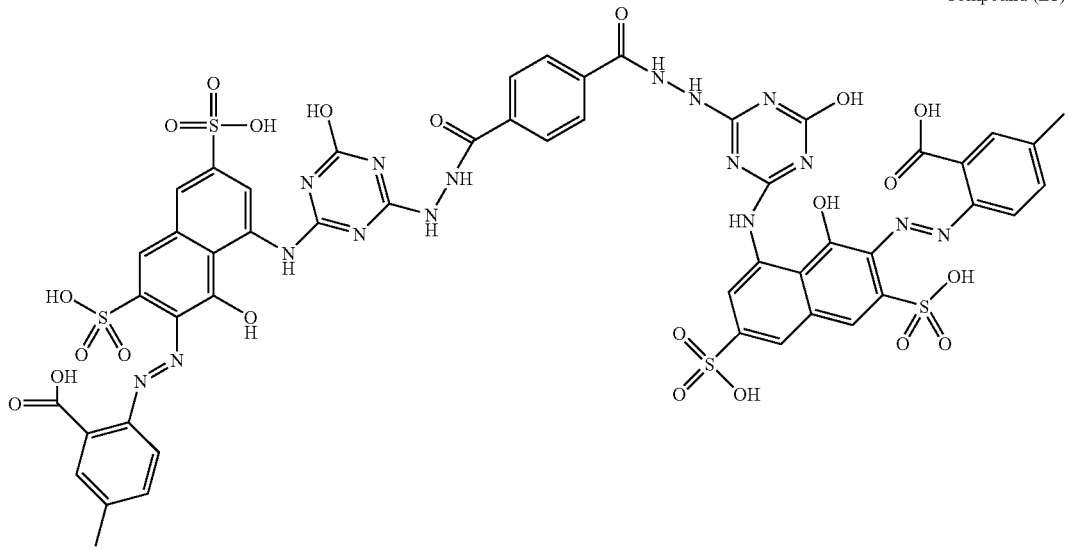

The inks were placed in a Canon 4300 ink jet printer and printed onto the papers indicated in Table 13 below. After drying, the light-fastness of the prints were measured by the general method described in Example 142 above and the results are shown in is Table 13 below:

TABLE 13

| Compound | Paper | ΔE |
|---|---|---|
| Compound (B2) | Canon HG 201 | 12 |
| Compound (C1) | Canon HG 201 | 12 |
| Comparative Dye (X) | Canon HG 201 | 24 |
| Compound (B2) | Canon GP 301 | 18 |
| Compound (C1) | Canon GP 301 | 18 |
| Comparative Dye (X) | Canon GP 301 | 51 |

Table 13 shows that Compounds (B2) and (C1) have higher light-fastness (lower ΔE) than Comparative Dye (X).

EXAMPLE 184

The inks described in Tables 14 to 22 may be prepared wherein the compound described in the first column is the compound described in the above examples. Numbers quoted in the second column onwards refer to the number of parts of the relevant ingredient and all parts are by weight. The inks may be applied to paper by thermal or piezo ink jet printing.

The following abbreviations are used in Table I and II:
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol
Proxel XL-2=biocide from Avecia Inc.
SUR=Surfynol 465 (an acetylinic surfactant)
GLY=glycerin
DGM=diethylene glycol monobutyl ether
SUR2=Surfynol 485
TEG=triethylene glycol monobutyl ether (further ink formulations may be prepared using the compositions described in U.S. Pat. No. 5,749,951 except that in place of the colorants used therein there is used an equal weight of the compound of Example 144).

TABLE 14

| Component | Component Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |  | 6 | 4 |  |  |  |  | 5 |  |
| 2 | 3.0 | 90 |  | 5 | 5 |  | 0.2 |  |  |  |  |  |
| 3 | 10.0 | 85 | 3 |  | 3 | 3 |  |  |  | 5 | 1 |  |
| 4 | 2.1 | 91 |  | 8 |  |  |  |  |  |  |  | 1 |
| 1 | 3.1 | 86 | 5 |  |  |  |  | 0.2 | 4 |  |  | 5 |
| 2 | 1.1 | 81 |  |  | 9 |  | 0.5 | 0.5 |  |  | 9 |  |
| 3 | 2.5 | 60 | 4 | 15 | 3 | 3 |  |  | 6 | 10 | 5 | 4 |
| 4 | 5 | 65 |  | 20 |  |  |  |  | 10 |  |  |  |
| 4 | 2.4 | 75 | 5 | 4 |  | 5 |  |  |  | 6 |  | 5 |
| 3 | 4.1 | 80 | 3 | 5 | 2 | 10 |  | 0.3 |  |  |  |  |
| 2 | 3.2 | 65 |  | 5 | 4 | 6 |  |  | 5 | 4 | 6 | 5 |
| 1 | 5.1 | 96 |  |  |  |  |  |  |  | 4 |  |  |
| 1 | 10.8 | 90 | 5 |  |  |  |  |  | 5 |  |  |  |
| 2 | 10.0 | 80 | 2 | 6 | 2 | 5 |  |  | 1 |  | 4 |  |
| 3 | 1.8 | 80 |  | 5 |  |  |  |  |  |  | 15 |  |
| 4 | 2.6 | 84 |  |  | 11 |  |  |  |  |  | 5 |  |
| 4 | 3.3 | 80 | 2 |  |  | 10 |  |  |  | 2 |  | 6 |
| 3 | 12.0 | 90 |  |  |  | 7 | 0.3 |  | 3 |  |  |  |
| 2 | 5.4 | 69 | 2 | 20 | 2 | 1 |  |  |  |  | 3 | 3 |
| 1 | 6.0 | 91 |  |  | 4 |  |  |  |  |  | 5 |  |

TABLE 15

| Dye | Dye Content | Water | PG | DEG | NMP | CET | TBT | TDG | BDL | PHO | 2P | PI2 |
|---|---|---|---|---|---|---|---|---|---|---|---|---|
| 4 | 3.0 | 80 | 15 |  |  | 0.2 |  |  |  |  | 5 |  |
| 3 | 9.0 | 90 |  | 5 |  |  |  |  |  | 1.2 |  | 5 |
| 2 | 1.5 | 85 | 5 | 5 |  | 0.15 | 5.0 | 0.2 |  |  |  |  |
| 1 | 2.5 | 90 |  | 6 | 4 |  |  |  |  | 0.12 |  |  |
| 1 | 3.1 | 82 | 4 | 8 |  | 0.3 |  |  |  |  |  | 6 |
| 2 | 0.9 | 85 |  |  | 10 |  |  |  | 5 | 0.2 |  |  |
| 3 | 8.0 | 90 |  | 5 | 5 |  |  | 0.3 |  |  |  |  |
| 4 | 4.0 | 70 |  | 10 | 4 |  |  |  | 1 |  | 4 | 11 |
| 4 | 2.2 | 75 | 4 | 10 | 3 |  |  |  | 2 |  | 6 |  |
| 3 | 10.0 | 91 |  |  | 6 |  |  |  |  |  | 3 |  |
| 2 | 9.0 | 76 |  |  | 9 | 7 |  | 3.0 |  | 0.95 | 5 |  |

TABLE 15-continued

| Dye | Dye Content | Water | PG | DEG | NMP | CET | TBT | TDG | BDL | PHO | 2P | PI2 |
|---|---|---|---|---|---|---|---|---|---|---|---|---|
| 1 | 5.0 | 78 | 5 | 11 | | | | | | | 6 | |
| 4 | 5.4 | 86 | | | 7 | | | | | | 7 | |
| 3 | 2.1 | 70 | 5 | 5 | 5 | 0.1 | 0.2 | 0.1 | 5 | 0.1 | 5 | |
| 2 | 2.0 | 90 | | 10 | | | | | | | | |
| 1 | 2 | 88 | | | | | | 10 | | | | |
| 2 | 5 | 78 | | | 5 | | | 12 | | | 5 | |
| 3 | 8 | 70 | 2 | | 8 | | | 15 | | | 5 | |
| 4 | 10 | 80 | | | | | | 8 | | | 12 | |
| 4 | 10 | 80 | | 10 | | | | | | | | |

TABLE 16

| Compound | Compound Content | Water | PG | DEG | NMP | DMK | NaOH | Na Stearate | IPA | MEOH | 2P | MIBK |
|---|---|---|---|---|---|---|---|---|---|---|---|---|
| 7 | 2.0 | 80 | 5 | | 6 | 4 | | | | | 5 | |
| 8 | 3.0 | 90 | | 5 | 5 | | 0.2 | | | | | |
| 9 | 10.0 | 85 | 3 | | 3 | 3 | | | | 5 | 1 | |
| 11 | 2.1 | 91 | | 8 | | | | | | | | 1 |
| 13 | 3.1 | 86 | 5 | | | | | 0.2 | 4 | | | 5 |
| 15 | 1.1 | 81 | | | 9 | | 0.5 | 0.5 | | | 9 | |
| 17 | 2.5 | 60 | 4 | 15 | 3 | 3 | | | 6 | 10 | 5 | 4 |
| 19 | 5 | 65 | | 20 | | | | | 10 | | | |
| 26 | 2.4 | 75 | 5 | 4 | | 5 | | | | 6 | | 5 |
| 36 | 4.1 | 80 | 3 | 5 | 2 | 10 | | 0.3 | | | | |
| 46 | 3.2 | 65 | | 5 | 4 | 6 | | | 5 | 4 | 6 | 5 |
| 55 | 5.1 | 96 | | | | | | | | 4 | | |
| 58 | 10.8 | 90 | 5 | | | | | | 5 | | | |
| 74 | 10.0 | 80 | 2 | 6 | 2 | 5 | | | 1 | | 4 | |
| 81 | 1.8 | 80 | | 5 | | | | | | | 15 | |
| 51 | 2.6 | 84 | | | 11 | | | | | | 5 | |
| 116 | 3.3 | 80 | 2 | | | 10 | | | | 2 | | 6 |
| 126 | 12.0 | 90 | | | | 7 | 0.3 | | 3 | | | |
| 156 | 5.4 | 69 | 2 | 20 | 2 | 1 | | | | | 3 | 3 |
| 131 | 6.0 | 91 | | | 4 | | | | | | 5 | |

TABLE 17

| Compound | Compound Content | Water | PG | DEG | NMP | CET | TBT | TDG | BDL | PHO | 2P | PI2 |
|---|---|---|---|---|---|---|---|---|---|---|---|---|
| 141 | 3.0 | 80 | 15 | | | 0.2 | | | | | 5 | |
| 98 | 9.0 | 90 | | 5 | | | | | | 1.2 | | 5 |
| 92 | 1.5 | 85 | 5 | 5 | | 0.15 | 5.0 | 0.2 | | | | |
| 57 | 2.5 | 90 | | 6 | 4 | | | | | 0.12 | | |
| 117 | 3.1 | 82 | 4 | 8 | | 0.3 | | | | | | 6 |
| 135 | 0.9 | 85 | | 10 | | | | | 5 | 0.2 | | |
| 113 | 8.0 | 90 | | 5 | 5 | | | 0.3 | | | | |
| 69 | 4.0 | 70 | | 10 | 4 | | | | 1 | | 4 | 11 |
| 21 | 2.2 | 75 | 4 | 10 | 3 | | | | 2 | | 6 | |
| 30 | 10.0 | 91 | | | 6 | | | | | | 3 | |
| 25 | 9.0 | 76 | | 9 | 7 | | 3.0 | | | 0.95 | 5 | |
| 47 | 5.0 | 78 | 5 | 11 | | | | | | | 6 | |
| 77 | 5.4 | 86 | | | 7 | | | | | | 7 | |
| 97 | 2.1 | 70 | 5 | 5 | 5 | 0.1 | 0.2 | 0.1 | 5 | 0.1 | 5 | |
| 87 | 2.0 | 90 | | 10 | | | | | | | | |
| 107 | 2 | 88 | | | | | | 10 | | | | |
| 113 | 5 | 78 | | | 5 | | | 12 | | | 5 | |
| 121 | 8 | 70 | 2 | | 8 | | | 15 | | | 5 | |
| 32 | 10 | 80 | | | | | | 8 | | | 12 | |
| 45 | 10 | 80 | | 10 | | | | | | | | |

TABLE 18

| Compound | Compound Content | Water | PG | DEG | NMP | DMK | NaOH | Na Stearate | IPA | MEOH | 2P | MIBK |
|---|---|---|---|---|---|---|---|---|---|---|---|---|
| 138 | 2.0 | 80 | 5 | | 6 | 4 | | | | | 5 | |
| 139 | 3.0 | 90 | | 5 | 5 | | 0.2 | | | | | |

TABLE 18-continued

| Compound | Compound Content | Water | PG | DEG | NMP | DMK | NaOH | Na Stearate | IPA | MEOH | 2P | MIBK |
|---|---|---|---|---|---|---|---|---|---|---|---|---|
| 140 | 10.0 | 85 | 3 |  | 3 | 3 |  |  |  | 5 | 1 |  |
| 141 | 2.1 | 91 |  | 8 |  |  |  |  |  |  |  | 1 |
| 142 | 3.1 | 86 | 5 |  |  |  |  | 0.2 | 4 |  |  | 5 |
| 143 | 1.1 | 81 |  |  | 9 |  | 0.5 | 0.5 |  |  | 9 |  |
| 144 | 2.5 | 60 | 4 | 15 | 3 | 3 |  |  | 6 | 10 | 5 | 4 |
| 139 | 5 | 65 |  | 20 |  |  |  |  | 10 |  |  |  |
| 146 | 2.4 | 75 | 5 | 4 |  | 5 |  |  |  | 6 |  | 5 |
| 147 | 4.1 | 80 | 3 | 5 | 2 | 10 |  | 0.3 |  |  |  |  |
| 148 | 3.2 | 65 |  | 5 | 4 | 6 |  |  | 5 | 4 | 6 | 5 |
| 149 | 5.1 | 96 |  |  |  |  |  |  |  | 4 |  |  |
| 150 | 10.8 | 90 | 5 |  |  |  |  |  | 5 |  |  |  |
| 151 | 10.0 | 80 | 2 | 6 | 2 | 5 |  |  | 1 |  | 4 |  |
| 152 | 1.8 | 80 |  | 5 |  |  |  |  |  |  | 15 |  |
| 153 | 2.6 | 84 |  |  | 11 |  |  |  |  |  | 5 |  |
| 139 | 3.3 | 80 | 2 |  |  | 10 |  |  |  | 2 |  | 6 |
| 155 | 12.0 | 90 |  |  |  | 7 | 0.3 |  | 3 |  |  |  |
| 156 | 5.4 | 69 | 2 | 20 | 2 | 1 |  |  |  |  | 3 | 3 |
| 157 | 6.0 | 91 |  |  | 4 |  |  |  |  |  | 5 |  |

TABLE 19

| Compound | Compound Content | Water | PG | DEG | NMP | CET | TBT | TDG | BDL | PHO | 2P | PI2 |
|---|---|---|---|---|---|---|---|---|---|---|---|---|
| 158 | 3.0 | 80 | 15 |  |  | 0.2 |  |  |  |  | 5 |  |
| 159 | 9.0 | 90 |  | 5 |  |  |  |  |  | 1.2 |  | 5 |
| 139 | 1.5 | 85 | 5 | 5 |  | 0.15 | 5.0 | 0.2 |  |  |  |  |
| 161 | 2.5 | 90 |  | 6 | 4 |  |  |  |  | 0.12 |  |  |
| 162 | 3.1 | 82 | 4 | 8 |  | 0.3 |  |  |  |  |  | 6 |
| 163 | 0.9 | 85 |  | 10 |  |  |  |  | 5 | 0.2 |  |  |
| 164 | 8.0 | 90 |  | 5 | 5 |  |  | 0.3 |  |  |  |  |
| 139 | 4.0 | 70 |  | 10 | 4 |  |  |  | 1 |  | 4 | 11 |
| 166 | 2.2 | 75 | 4 | 10 | 3 |  |  |  | 2 |  | 6 |  |
| 167 | 10.0 | 91 |  |  | 6 |  |  |  |  |  | 3 |  |
| 168 | 9.0 | 76 |  | 9 | 7 |  | 3.0 |  |  | 0.95 | 5 |  |
| 169 | 5.0 | 78 | 5 | 11 |  |  |  |  |  |  | 6 |  |
| 170 | 5.4 | 86 |  |  | 7 |  |  |  |  |  | 7 |  |
| 171 | 2.1 | 70 | 5 | 5 | 5 | 0.1 | 0.2 | 0.1 | 5 | 0.1 | 5 |  |
| 138 | 2 | 88 |  |  |  |  |  | 10 |  |  |  |  |
| 139 | 5 | 78 |  |  | 5 |  |  | 12 |  |  | 5 |  |
| 150 | 8 | 70 | 2 |  | 8 |  |  | 15 |  |  | 5 |  |
| 139 | 10 | 80 |  |  |  |  |  | 8 |  |  | 12 |  |
| 155 | 10 | 80 |  |  | 10 |  |  |  |  |  |  |  |

TABLE 20

| Compound | Compound Content | Water | DGM | TEG | NMP | GLY | NaOH | SUR | SUR2 | DEG | 2P | Proxel XL-2 |
|---|---|---|---|---|---|---|---|---|---|---|---|---|
| 138 | 2.0 | 80 | 10 |  | 1 | 4 |  |  |  |  | 5 |  |
| 139 | 3.0 | 90 |  | 10 |  |  | 0.2 |  |  |  |  |  |
| 139 | 10.0 | 81 | 10 | 5 | 3 |  |  |  |  |  | 1 |  |
| 141 | 2.1 | 84 | 5 | 10 |  |  |  |  |  | 0.7 |  | 0.3 |
| 139 | 3.1 | 86 | 5 |  |  | 8.4 |  | 0.2 | 0.2 |  |  | 0.2 |
| 143 | 1.1 | 81 |  | 9 |  | 6 |  | 1.2 |  |  | 2.8 |  |
| 140 | 2.5 | 70 | 4 | 5 | 3 | 3 |  |  |  | 0.1 | 10 | 4.9 |
| 139 | 5 | 65 |  | 20 |  | 14.4 |  |  | 0.6 |  |  |  |
| 139 | 2.4 | 75 | 5 | 4 |  | 5 |  |  |  | 6 | 4.75 | 0.25 |
| 147 | 4.1 | 80 | 3 | 5 | 2 | 9.7 |  | 0.3 |  |  |  |  |
| 139 | 3.2 | 65 |  | 17.7 | 6 |  |  | 1.0 | 4 | 6 | 0.3 |  |
| 149 | 5.1 | 96 |  |  |  |  |  |  | 4 |  |  |  |
| 150 | 2.6 | 90 | 5 |  |  | 4.2 |  |  | 0.8 |  |  |  |
| 139 | 3.2 | 80 | 2 | 6 | 2 | 5 |  | 1.0 |  |  | 4 |  |
| 152 | 1.8 | 80 |  | 5 |  |  |  |  |  |  | 15 |  |
| 139 | 2.6 | 84 |  | 11 |  |  |  |  |  |  | 5 |  |
| 139 | 3.3 | 80 | 10 |  |  | 9 |  | 0.3 | 0.4 |  |  | 0.3 |
| 151 | 2.1 | 90 | 1 | 1 |  | 7 | 0.3 |  | 0.7 |  |  |  |

TABLE 20-continued

| Compound | Compound Content | Water | DGM | TEG | NMP | GLY | NaOH | SUR | SUR2 | DEG | 2P | Proxel XL-2 |
|---|---|---|---|---|---|---|---|---|---|---|---|---|
| 139 | 5.4 | 69 | 2 | 20 | 2 | 2 | 1 | 0.7 | 0.4 | | 3 | 0.3 |
| 157 | 6.0 | 91 | 1 | 1 | 1 | 1 | | 1 | 1 | 1 | 1 | 1 |

TABLE 21

| Compound | Compound Content | Water | PG | DEG | NMP | DMK | NaOH | Na Stearate | IPA | MEOH | 2P | MIBK |
|---|---|---|---|---|---|---|---|---|---|---|---|---|
| A3 | 2.0 | 80 | 5 | | 6 | 4 | | | | | 5 | |
| B2 | 3.0 | 90 | | 5 | 5 | | 0.2 | | | | | |
| C1 | 10.0 | 85 | 3 | | 3 | 3 | | | | 5 | 1 | |
| D1 | 2.1 | 91 | | 8 | | | | | | | | 1 |
| E1 | 3.1 | 86 | 5 | | | | | 0.2 | 4 | | | 5 |
| A3 | 1.1 | 81 | | | 9 | | 0.5 | 0.5 | | | 9 | |
| C1 | 2.5 | 60 | 4 | 15 | 3 | 3 | | | 6 | 10 | 5 | 4 |
| E1 | 5 | 65 | | 20 | | | | | 10 | | | |
| B2 | 2.4 | 75 | 5 | 4 | | 5 | | | | 6 | | 5 |
| D1 | 4.1 | 80 | 3 | 5 | 2 | 10 | | 0.3 | | | | |
| B2 | 3.2 | 65 | | 5 | 4 | 6 | | | 5 | 4 | 6 | 5 |
| D1 | 5.1 | 96 | | | | | | | | 4 | | |
| A3 | 10.8 | 90 | 5 | | | | | | 5 | | | |
| C1 | 10.0 | 80 | 2 | 6 | 2 | 5 | | | 1 | | 4 | |
| E1 | 1.8 | 80 | | 5 | | | | | | | 15 | |
| E1 | 2.6 | 84 | | | 11 | | | | | | 5 | |
| D1 | 3.3 | 80 | 2 | | | 10 | | | | 2 | | 6 |
| C1 | 12.0 | 90 | | | | 7 | 0.3 | | 3 | | | |
| B2 | 5.4 | 69 | 2 | 20 | 2 | 1 | | | | | 3 | 3 |
| A3 | 6.0 | 91 | | | | 4 | | | | | 5 | |

TABLE 22

| Compound | Compound Content | Water | PG | DEG | NMP | CET | TBT | TDG | BDL | PHO | 2P | PI2 |
|---|---|---|---|---|---|---|---|---|---|---|---|---|
| A3 | 3.0 | 80 | 15 | | | 0.2 | | | | | 5 | |
| B2 | 9.0 | 90 | | 5 | | | | | | 1.2 | | 5 |
| C1 | 1.5 | 85 | 5 | 5 | | 0.15 | 5.0 | 0.2 | | | | |
| D1 | 2.5 | 90 | | 6 | 4 | | | | | 0.12 | | |
| E1 | 3.1 | 82 | 4 | 8 | | 0.3 | | | | | | 6 |
| A3 | 0.9 | 85 | | 10 | | | | | 5 | 0.2 | | |
| C1 | 8.0 | 90 | | 5 | 5 | | | 0.3 | | | | |
| E1 | 4.0 | 70 | | 10 | 4 | | | | 1 | | 4 | 11 |
| B2 | 2.2 | 75 | 4 | 10 | 3 | | | | 2 | | 6 | |
| D1 | 10.0 | 91 | | | 6 | | | | | | 3 | |
| B2 | 9.0 | 76 | | 9 | 7 | | 3.0 | | | 0.95 | 5 | |
| D1 | 5.0 | 78 | 5 | 11 | | | | | | | 6 | |
| A3 | 5.4 | 86 | | | 7 | | | | | | 7 | |
| C1 | 2.1 | 70 | 5 | 5 | 5 | 0.1 | 0.2 | 0.1 | 5 | 0.1 | 5 | |
| E1 | 2.0 | 90 | | 10 | | | | | | | | |
| B2 | 2 | 88 | | | | | | 10 | | | | |
| A3 | 5 | 78 | | | 5 | | | 12 | | | 5 | |
| B2 | 8 | 70 | 2 | | 8 | | | 15 | | | 5 | |
| B2 | 10 | 80 | | | | | | 8 | | 12 | | |
| B2 | 10 | 80 | | 10 | | | | | | | | |

What is claimed is:

1. A composition comprising:
   (a) liquid medium; and
   (b) a compound comprising one or more azo-chromophoric groups and one or more hydrazide groups; wherein the hydrazide groups are each independently of Formula (2a):

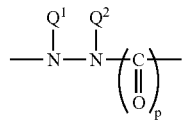

Formula (2a)

wherein:
  p is 1 or 2;
  $Q^1$ and $Q^2$ are each independently H, optionally substituted alkyl or optionally substituted aryl, or $Q^1$ and $Q^2$ together with the nitrogen atoms to which they are attached form an optionally substituted 5- or 6- membered ring;
  wherein the compound is free from fibre reactive groups and contains a single group of Formula (1) or salt thereof

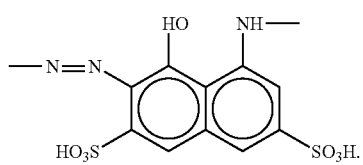

Formula (1)

2. A compound comprising one or more azo-chromophoric groups and one or more hydrazide groups of Formula (2a)

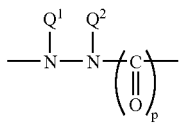

Formula (2a)

wherein:
  p is 1 or 2;
  $Q^1$ and $Q^2$ are each independently H, optionally substituted alkyl or optionally substituted aryl, or $Q^1$ and $Q^2$ together with the nitrogen atoms to which they are attached form an optionally substituted 5- or 6- membered ring;
provided that the compound is free from fibre reactive groups and contains a single group of Formula (1) or salt thereof:

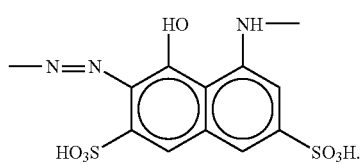

Formula (1)

3. A compound according to claim 2 which further comprises at least one water-solubilising group.

4. A compound according to claim 3 which further comprises at least one carboxy group.

5. A process for the coloration of a substrate comprising applying thereto by means of an ink jet printer a composition comprising:
  (a) a liquid medium; and
  (b) a compound comprising one or more azo-chromophoric groups and one or more hydrazide groups of Formula (2a):

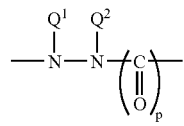

Formula (2a)

wherein:
  p is 1 or 2;
  $Q^1$ and $Q^2$ are each independently H, optionally substituted alkyl or optionally substituted aryl, or $Q^1$ and $Q^2$ together with the nitrogen atoms to which they are attached form an optionally substituted 5- or 6- membered ring;
  wherein the liquid medium comprises water and an organic solvent, an organic solvent free from water, or a low melting point solid.

6. A process according to claim 5 wherein the substrate is a porous paper.

7. A substrate printed by a process comprising applying thereto by means of an ink jet printer a composition comprising
  (a) a liquid medium; and
  (b) a compound comprising one or more azo-chromophoric groups and one or more hydrazide groups of Formula (2a):

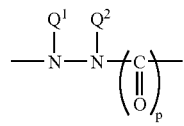

Formula (2a)

wherein:
  p is 1 or 2;
  $Q^1$ and $Q^2$ are each independently H, optionally substituted alkyl or optionally substituted aryl, or $Q^1$ and $Q^2$ together with the nitrogen atoms to which they are attached form an optionally substituted 5- or 6- membered ring;
  wherein the liquid medium comprises water and an organic solvent, an organic solvent free from water, or a low melting point solid.

8. An ink jet printer cartridge comprising a chamber and ink, wherein the ink is present in the chamber and the ink comprises
  (a) a liquid medium; and
  (b) a compound comprising one or more azo-chromophoric groups and one or more hydrazide groups; wherein the hydrazide groups are each independently of Formula (2a):

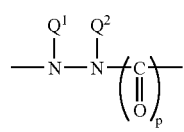

Formula (2a)

wherein:
  p is 1 or 2;
  $Q^1$ and $Q^2$ are each independently H, optionally substituted alkyl or optionally substituted aryl, or $Q^1$ and $Q^2$ together with the nitrogen atoms to which they are attached form an optionally substituted 5- or 6- membered ring;
wherein the compound is free from fibre reactive groups and contains a single group of Formula (1) or salt thereof:

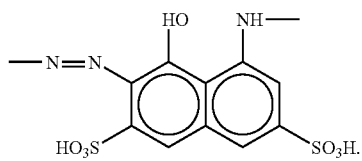

Formula (1)

9. An ink jet printer containing a cartridge according to claim 8.

10. A process according to claim 5 wherein the compound comprises from 1 to 8 hydrazide groups.

11. A process according to claim 5 wherein the compound is free from fibre reactive groups.

12. A process according to claim 5 wherein the compound comprises one or more hydrazide groups of Formula (2a) and a single group of Formula (1) or salt thereof

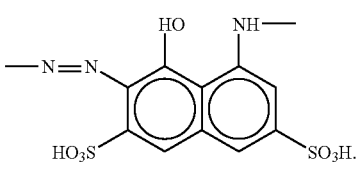

Formula (1)

13. A process according to claim 5 wherein the compound further comprises at least one carboxy group.

* * * * *